US 9,800,774 B2

(12) United States Patent
Naruse et al.

(10) Patent No.: US 9,800,774 B2
(45) Date of Patent: Oct. 24, 2017

(54) IMAGE CAPTURE DEVICE WITH RESTORATION PROCESSING AND IMAGE RESTORATION PROCESSING METHOD

(71) Applicant: FUJIFILM Corporation, Tokyo (JP)

(72) Inventors: Yousuke Naruse, Saitama (JP); Kenkichi Hayashi, Saitama (JP); Masahiko Sugimoto, Saitama (JP); Kosuke Irie, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/987,246

(22) Filed: Jan. 4, 2016

(65) Prior Publication Data

US 2016/0165127 A1   Jun. 9, 2016

Related U.S. Application Data

(63) Continuation of application No. PCT/JP2014/066136, filed on Jun. 18, 2014.

(30) Foreign Application Priority Data

Jul. 29, 2013  (JP) .................................. 2013-156948

(51) Int. Cl.
*H04N 5/228*  (2006.01)
*H04N 5/232*  (2006.01)
(Continued)

(52) U.S. Cl.
CPC ......... *H04N 5/23212* (2013.01); *G06T 5/003* (2013.01); *G06T 5/20* (2013.01);
(Continued)

(58) Field of Classification Search
CPC .. H04N 5/23212; H04N 5/3696; G06T 5/003; G06T 2207/20024; G06T 5/00
(Continued)

(56) References Cited

U.S. PATENT DOCUMENTS 6,166,853 A * 12/2000 Sapia ..................... G02B 21/00
                                                          359/559
7,881,551 B2 * 2/2011 Paik ................... H04N 5/23212
                                                          382/254
(Continued)

FOREIGN PATENT DOCUMENTS

JP       2006-238032 A    9/2006
JP       2008-11492 A     1/2008
(Continued)

OTHER PUBLICATIONS

International Preliminary Report on Patentability (PCT/IPEA/409), issued in PCT/JP2014/066136, dated Jul. 8, 2015.
(Continued)

*Primary Examiner* — Ngoc-Yen Vu
(74) *Attorney, Agent, or Firm* — Birch, Stewart, Kolasch & Birch, LLP

(57) ABSTRACT

A first restoration processing section 110 and a second restoration processing section 120 perform restoration processing on images (luminance data Y), which are successively captured by an image capture section, using a first filter 102, which is a restoration filter generated corresponding to a point spread function of an optical system, and a second filter 104 of which a restoration strength is weaker than that of the first filter 102. Depending on a result of determination which is input from an in-focus determination section 150 and indicates whether or not the image at the current time point is in a target in-focus state, a selection section 122 selects and outputs either luminance data $Y_A$ which is processed using the first filter 102 or luminance data $Y_B$ which is processed using the second filter 104.

20 Claims, 31 Drawing Sheets

(51) Int. Cl.
    *G06T 5/00*    (2006.01)
    *G06T 5/20*    (2006.01)
    *G03B 13/00*   (2006.01)

(52) U.S. Cl.
    CPC ............ *G06T 2207/10004* (2013.01); *G06T 2207/10016* (2013.01); *G06T 2207/10024* (2013.01); *G06T 2207/10148* (2013.01); *G06T 2207/20024* (2013.01)

(58) Field of Classification Search
    USPC .................................................. 348/345, 342
    See application file for complete search history.

(56) References Cited

U.S. PATENT DOCUMENTS

| | | | | |
|---|---|---|---|---|
| 8,350,948 B2* | 1/2013 | Miyauchi | ........... | G02B 27/0075 348/222.1 |
| 8,416,335 B2* | 4/2013 | Watanabe | ............. | H04N 5/772 348/222.1 |
| 8,531,545 B2* | 9/2013 | Kosaka | ............. | H04N 5/3572 348/222.1 |
| 8,798,389 B2* | 8/2014 | Hatakeyama | ........... | G06T 5/003 382/260 |
| 8,830,351 B2* | 9/2014 | Hatakeyama | .......... | H04N 9/045 348/223.1 |
| 9,049,356 B2* | 6/2015 | Watanabe | ............... | G06T 5/003 |
| 9,083,879 B2* | 7/2015 | Tamaki | ............. | H04N 5/23212 |
| 9,311,688 B1* | 4/2016 | Rosenberg | ............... | G06T 1/20 |
| 9,489,719 B2* | 11/2016 | Naruse | .................. | H04N 5/217 |
| 2011/0128422 A1 | 6/2011 | Nagata | | |
| 2011/0242372 A1 | 10/2011 | Kosaka | | |

FOREIGN PATENT DOCUMENTS

| | | |
|---|---|---|
| JP | 2009-111587 A | 5/2009 |
| JP | 2011-135563 A | 7/2011 |
| JP | 2011-211669 A | 10/2011 |
| JP | 2012-4664 A | 1/2012 |
| JP | 2012-5056 A | 1/2012 |

OTHER PUBLICATIONS

International Search Report issued in PCT/JP2014/066136, dated Sep. 16, 2014.
Written Opinion of the International Searching Authority issued in PCT/JP2014/066136, dated Sep. 16, 2014.

* cited by examiner

FIG. 4A
FIG. 4B
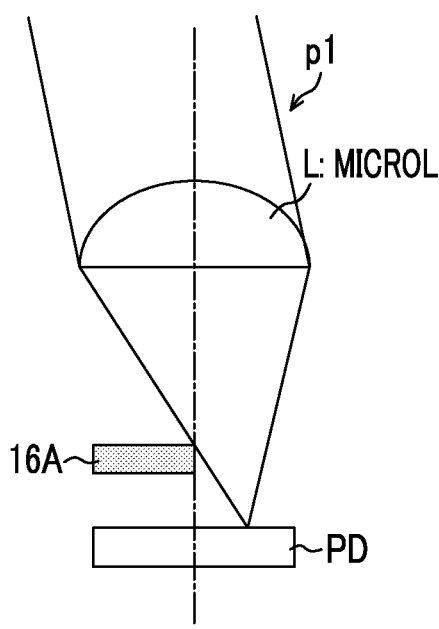
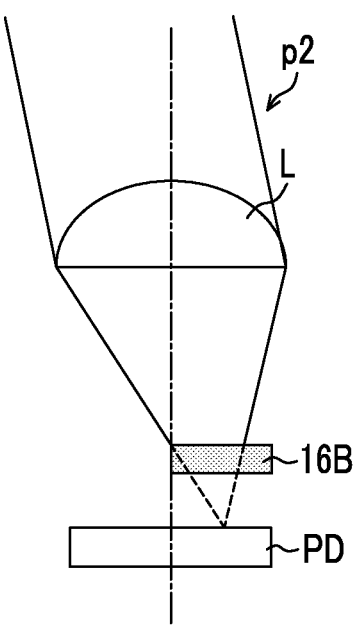

IMAGE CAPTURE DEVICE WITH RESTORATION PROCESSING AND IMAGE RESTORATION PROCESSING METHOD

CROSS-REFERENCE TO RELATED APPLICATIONS

This application is a Continuation of PCT International Application No. PCT/JP2014/066136 filed on Jun. 18, 2014, which claims priority under 35 U.S.C. §119(a) to Patent Application No. 2013-156948 filed in Japan on Jul. 29, 2013, all of which are hereby expressly incorporated by reference into the present application.

BACKGROUND OF THE INVENTION

1. Field of the Invention

The present invention relates to an image capture device and an image processing method. In particular, the invention relates to a technology of performing restoration processing of restoring a moving image captured through an optical system on the basis of a point spread function (PSF) or an optical transfer function (OTF) of the optical system.

2. Description of the Related Art

Restoration processing for a captured image is processing of obtaining characteristics of degradation (PSF or OTF) caused by aberration and the like of an optical system (photography lens) in advance and restoring a captured image (degraded image) to a high-resolution image through restoration processing performed by using a restoration filter which is generated on the basis of a PSF or OTF.

Between a PSF and OTF, there is a relationship of Fourier transform, where the PSF is a real function and the OTF is a complex function. As things having information equivalent thereto, there are a modulation transfer function or an amplitude transfer function (MTF) and a phase transfer function (PTF), and these functions respectively indicate an amplitude component and a phase component of an OTF. An MTF and a PTF have amounts of information equivalent to those of an OTF and a PSF.

In the past, when a high-resolution image has been restored from a degraded image, in case where the restoration processing has been performed using a restoration filter which is generated such that it becomes one ideal point after the restoration, a problem has arisen in that a high-frequency component is excessively restored (overcorrected) and image disturbance occurs. In order to solve this problem, the image restoration method described in JP2006-238032A performs the restoration processing through a restoration filter having a fine point spread even after the restoration so as to suppress roughness or disturbance of the image caused by the high-frequency component of the restored image by attenuating the high-frequency component.

The image capture device described in JP2008-11492A is characterized in that a first filter used in restoration processing for a still image is different from a second filter used in restoration processing for a moving image. In particular, by making a filter size of the second filter smaller than a filter size of the first filter, it is possible to achieve reduction in a time period (real time) of the restoration processing for the moving image and accurately perform the restoration processing on the still image.

SUMMARY OF THE INVENTION

However, when a degraded image of images (frames) of the captured moving image is restored to a high-resolution image by using the restoration filter, it is necessary for a processing target image to be in focus. The reason for this is that the restoration filter is generated on the basis of a PSF or OTF of the focused image. Accordingly, there is a problem in that, when the restoration processing is performed on a defocused image by using the restoration filter, image quality becomes lower than that of the image not subjected to the restoration processing.

In particular, in the case of the moving image, images of a moving photographic subject are captured or images are captured by panning and/or tilting a camera. Thus, even in a camera having an auto focus adjustment mechanism, a time difference occurs until the photographic subject is brought into focus. As a result, there is a problem in that inappropriate restoration processing is on a moving image captured during the time difference.

JP2006-238032A and JP2008-11492A do not describe the above-mentioned problems.

In the invention described in JP2006-238032A, the restoration processing is performed through the restoration filter having a fine point spread. Accordingly, it is possible to prevent overcorrection in the restoration processing. However, there is a problem in that a high-resolution moving image cannot be obtained.

In the invention described in JP2008-11492A, the second filter used in the restoration processing for the moving image has a smaller filter size than the first filter used in the restoration processing for the still image. Accordingly, there are problems in that accuracy in restoration is low and a high-resolution moving image cannot be obtained. Further, in the invention described in JP2008-11492A, it is a premise that an optical system is provided which is formed such that an amount of defocus at an in-focus position and a distance to an anteroposterior position thereof are set to be substantially constant, that is, an image capture device including an optical wavefront modulation element in an optical system. Therefore, there is no auto focus adjustment mechanism, and there is no problem that the present invention is for solving.

The present invention has been made in consideration of the above-mentioned situations, and an object of the invention is to provide an image capture device and an image processing method capable of preventing images of a degraded moving image from being overcorrected through restoration processing and acquiring high-resolution images through the restoration processing.

In order to achieve the object, according to a first aspect of the present invention, there is provided an image capture device including: an image capture section that successively captures images; an auto focus adjustment section that automatically performs focus adjustment on the images which are successively captured by the image capture section; a first filter acquisition section that acquires a first filter as a restoration filter which is generated corresponding to a point spread function of an optical system of the image capture section; a second filter acquisition section that acquires a second filter which is applied to a defocused image of the images successively captured by the image capture section and of which a restoration strength is weaker than a restoration strength of the first filter; an in-focus determination section that determines whether or not a processing target image of the images successively captured by the image capture section is in a target in-focus state, due to the focus adjustment performed by the auto focus adjustment section; and a restoration processing section that performs a restoration processing, which uses at least the second filter acquired by the second filter acquisition section, on the processing target image in case where the in-focus determination section determines that the processing target image is not in the target in-focus state, and performs restoration processing which uses the first filter acquired by the first filter acquisition section, on the processing target image in case where the in-focus determination section determines that the processing target image is in the target in-focus state.

According to the first aspect of the present invention, among the successively captured images, an image (defocused image), which is not in the target in-focus state, is subjected to the restoration processing through the second filter which is applied to the defocused image and of which the restoration strength is weak. Hence, image quality is not lowered due to overcorrection and the like. In contrast, an image, which is in the target in-focus state, is subjected to the restoration processing through the first filter as the restoration filter which is generated corresponding to the point spread function of the optical system. Hence, a degraded image is restored to a high-resolution image through the point spread function of the optical system.

In the image capture device according to a second aspect of the present invention, it is preferable that the restoration processing section performs the restoration processing on the processing target image on the basis of the acquired first and second filters, in case where the in-focus determination section determines that the processing target image is not in the target in-focus state. That is, in case where it is determined that the image is not in the target in-focus state, the restoration processing using the first and second filters is performed on the processing target image.

The image capture device according to a third aspect of the present invention further includes a focusing time estimation section that estimates a focusing time period from when the focus adjustment is started by the auto focus adjustment section to when the target in-focus state is achieved. In the image capture device, it is preferable the restoration processing section performs the restoration processing on the processing target image, on the basis of the acquired first and second filters and the estimated focusing time period, in case where the in-focus determination section determines that the processing target image is not in the target in-focus state. Thereby, it is possible to perform the restoration processing appropriate for the estimated focusing time period through the first and second filters.

In the image capture device according to a fourth aspect of the present invention, it is preferable that the auto focus adjustment section detects an amount of defocus of each captured image and controls the optical system until the detected amount of defocus enters a depth-of-focus range, and the focusing time estimation section estimates a focusing time period from when the amount of defocus is detected to when it enters the depth-of-focus range. When the auto focus adjustment section performs the focus adjustment, this is accompanied by mechanical movement of the optical system (focus lens or the like). Accordingly, there is a time difference from when the amount of defocus is detected to when it enters the depth-of-focus range. Further, when a driving speed of the focus lens is excessively high, hunting of the auto focus adjustment occurs. For this reason, there is also a method of making a lens driving speed lower when the focus lens is closer to the in-focus position. Thereby, there is a certain time difference from when the amount of defocus is detected to when it enters the depth-of-focus range.

According to the fourth aspect of the present invention, when the optical system is controlled on the basis of the amount of defocus, a time period from when the amount of defocus is detected to when the amount of defocus enters the depth-of-focus range is estimated. In addition, the focusing time period may be estimated by the focusing time estimation section for each of the images which are successively captured, and may be estimated for each of a predetermined number of images.

In the image capture device according to a fifth aspect of the present invention, it is preferable that the focusing time estimation section estimates the focusing time period only when the amount of defocus detected by the auto focus adjustment section is equal to or less than a threshold value, and the restoration processing section performs restoration processing by using only the acquired second filter when the amount of defocus is greater than the threshold value.

In case where the amount of defocus is greater than the threshold value, a degree of blurring of the image, which is acquired at the time point, is large. When the restoration processing including the first filter is performed on a blurred image, the image quality is rather degraded. Accordingly, in case where the detected amount of defocus is greater than the threshold value, the restoration processing is performed by using the second filter only. In contrast, in case where the amount of defocus is equal to or less than the threshold value, the focusing time period is estimated so as to perform the restoration processing using the first and second filters.

In the image capture device according to a sixth aspect of the present invention, it is preferable that the auto focus adjustment section calculates a high-frequency component of an in-focus region of each image captured by the image capture section as an evaluation value, and controls the optical system until the calculated evaluation value reaches a peak value, and the focusing time estimation section estimates a time period that elapses until the evaluation value reaches a first threshold value corresponding to the target in-focus state, on the basis of change in the evaluation value calculated by the auto focus adjustment section.

The auto focus adjustment section controls the optical system such that the evaluation value indicating the high-frequency component of the in-focus region of the image reaches the peak value. In particular, in the case of successively captured images (a moving image and the like), the auto focus adjustment section performs so-called hill-climbing control for controlling the optical system such that the evaluation value is maintained at the peak position. In the case of the hill-climbing control, by calculating the evaluation value of each of the images successively acquired while controlling the optical system, at the time point where the calculated evaluation value decreases to become less than the peak value, it is determined that the image is in the in-focus state. Therefore, the first threshold value corresponding to the target in-focus state is determined, and the time period, which will elapse before the evaluation value reaches the first threshold value, is estimated, on the basis of change in the evaluation value which is calculated by the auto focus adjustment section.

In the image capture device according to a seventh aspect of the present invention, it is preferable that the focusing time estimation section estimates the focusing time period only in case where the evaluation value calculated by the auto focus adjustment section is equal to or greater than a second threshold value which is less than the first threshold value, and the restoration processing section performs the restoration processing by using only the acquired second filter in case where the evaluation value calculated by the auto focus adjustment section is less than the second threshold value.

In case where the calculated evaluation value is less than the second threshold value, a degree of blurring of the image, which is acquired at the time point, is large. When the restoration processing including the first filter is performed on a blurred image, the image quality is rather degraded. Accordingly, in case where the calculated evaluation value is less than the second threshold value, the restoration processing is performed by using the second filter only. In contrast, in case where the evaluation value is equal to or greater than the second threshold value, the focusing time period is estimated so as to perform the restoration processing using the first and second filters.

In the image capture device according to an eighth aspect of the present invention, it is preferable that the restoration processing section generates a first image and a second image by performing the restoration processing on the processing target image respectively on the basis of the acquired first and second filters, in case where the in-focus determination section determines that the processing target image is not in the target in-focus state, and generates restored images by performing weighted averaging on the first and second images through weighting that gives a larger weight to the first image when the focusing time period estimated by the focusing time estimation section is shorter.

That is, the first and second images are generated by performing the restoration processing on the processing target image respectively on the basis of the acquired first and second filters, and restored images are generated by performing weighted averaging on the generated first and second images. The weighting at the time of weighted averaging gives a larger weight to the first image when the focusing time period estimated by the focusing time estimation section is shorter. Thereby, in a time period from a blurred state to an in-focus state, weighting at the time of weighted averaging is changed, and smoothly connected restored images can be generated.

In the image capture device according to a ninth aspect of the present invention, it is preferable that the auto focus adjustment section detects an amount of defocus of each captured image and controls the optical system until the detected amount of defocus enters a depth-of-focus range, and the restoration processing section generates the first image and the second image by performing the restoration processing on the processing target image respectively on the basis of the acquired first and second filters, in case where the in-focus determination section determines that the processing target image is not in the target in-focus state, and generates restored images by performing weighted averaging on the first and second images through weighting that gives a larger weight to the first image when the detected amount of defocus is smaller.

That is, the first and second images are generated by performing the restoration processing on the processing target image respectively on the basis of the first and second filters, and restored images are generated by performing weighted averaging on the generated first and second images. The weighting at the time of weighted averaging gives a larger weight to the first image when the detected amount of defocus is smaller. Thereby, in the time period from the blurred state to the in-focus state, weighting at the time of weighted averaging is changed, and smoothly connected restored images can be generated.

In the image capture device according to a tenth aspect of the present invention, it is preferable the auto focus adjustment section detects an amount of defocus of each captured image and controls the optical system until the detected amount of defocus enters a depth-of-focus range, the restoration processing section has a third filter calculation section that calculates a third filter for the images which are acquired by the image capture section on the basis of the acquired first and second filters and the detected amount of defocus, the third filter calculation section calculating the third filter having a filter coefficient which gradually becomes closer to a filter coefficient of the first filter from a filter coefficient of the second filter when the detected amount of defocus becomes smaller, and the restoration processing is performed on an image, which is captured immediately before the target in-focus state is achieved after the focus adjustment is started by the auto focus adjustment section, among the images successively captured by the image capture section, by using the third filter calculated by the third filter calculation section, and the restoration processing is performed on an image, which is in the target in-focus state, by using the acquired first filter.

In the image capture device according to an eleventh of the present invention, it is preferable that the restoration processing section has a third filter calculation section that calculates a third filter for the processing images which are acquired by the image capture section on the basis of the acquired first and second filters and the estimated focusing time period, the third filter calculation section calculating the third filter having a filter coefficient which gradually becomes closer to a filter coefficient of the first filter from a filter coefficient of the second filter when the focusing time period becomes longer, and the restoration processing is performed on an image, which is captured immediately before the target in-focus state is achieved after the focus adjustment is started by the auto focus adjustment section, among the images successively captured by the image capture section, by using the third filter calculated by the third filter calculation section, and the restoration processing is performed on an image, which is in the target in-focus state, by using the acquired first filter.

According to the eleventh aspect of the present invention, the third filter having the filter coefficient, which gradually becomes closer to the filter coefficient of the first filter from the filter coefficient of the second filter when the focusing time period becomes longer, is calculated, and the restoration processing is performed on the image, which is captured immediately before the target in-focus state is achieved after the focus adjustment is started, by using the calculated third filter. As a result, smoothly connected restored images can be generated regardless of the in-focus state.

In the image capture device according to a twelfth aspect of the present invention, it is preferable that in case where t>t0 is established where t is a current time and t0 is a previous time at which the third filter calculation section calculated the third filter, assuming that the third filter at the previous time t0 is X(t0), the third filter at the current time t is X(t), a focusing time estimated by the focusing time estimation section at the previous time t0 is t1, the first filter acquired by the first filter acquisition section and corresponding to photography conditions of the optical system at the focusing time t1 is F, the second filter acquired by the second filter acquisition section is A, and a monotonically increasing function is W(r) where W(0)=0, W(1)=1, and the third filter calculation section calculates a currently used third filter X(t) through the following expression X(t)=(1−W(r))×X(t0)+W(r)×F, where r=(t−t0)/(t1−t0), and X(0)=A.

In the image capture device according to a thirteenth aspect of the present invention, it is preferable that the third filter calculation section calculates the third filter whenever a plurality of images is acquired from the image capture section, and the restoration processing section uses the third filter, which is calculated by the third filter calculation section, in the restoration processing for the plurality of images.

In the image capture device according to a fourteenth aspect of the present invention, it is preferable that the first filter acquisition section acquires the first filter, which is generated corresponding to the point spread function under photography conditions, on the basis of the photography conditions of the optical system after elapse of the focusing time period estimated by the focusing time estimation section.

According to the fourteenth aspect of the present invention, the filter corresponding to the photography conditions of the optical system after elapse of the estimated focusing time period is used as the first filter. Hence, the images, which are captured immediately before the target in-focus state is achieved after the focus adjustment is started, can be used as the restored images which are smoothly connected.

The image capture device according to a fifth aspect of the present invention further includes: a photography preparation instruction section that outputs a photography preparation instruction in accordance with a user's instruction input; and a display section that displays the images successively captured by the image capture section as a live view image. In the image capture device, it is preferable that the restoration processing section performs the restoration processing by using only the acquired second filter at least until the photography preparation instruction is output from the photography preparation instruction section.

Normally, the focus adjustment is not performed by the auto focus adjustment section during the time period that elapses until the photography preparation instruction is output from the photography preparation instruction section. Hence, the restoration processing is performed on the image (live view image) acquired during the time period, by using the second filter only. Thereby, image quality is not lowered due to overcorrection and the like.

In the image capture device according to a sixteenth aspect of the present invention, it is preferable that the restoration processing section performs the restoration processing by using the acquired first filter when the photography preparation instruction is output from the photography preparation instruction section and the focus adjustment is performed by the auto focus adjustment section. That is, the photography preparation instruction is output from the photography preparation instruction section, and the focus adjustment is performed by the auto focus adjustment section. As a result, when the image which is in the target in-focus state is acquired, the restoration processing is performed on the image by using the first filter. Thereby, it is possible to restore a degraded image to a high-resolution image through the point spread function of the optical system.

In the image capture device according to a seventeenth aspect of the present invention, it is preferable that the second filter is at least one of an edge enhancement filter, a restoration filter in which a modulation transfer function (MTF) after the restoration is not greater than 1.0, a zero phase filter, a restoration filter which is generated corresponding to the point spread function in a region where an amount of aberration of the optical system is smallest, and a filter which has 1 at a center of a kernel and 0 at positions other than the center.

According to an eighteenth aspect of the present invention, there is provided an image processing method including: an image acquisition step of successively acquiring images from an image capture section; an auto focus adjustment step of automatically performing focus adjustment on the images which are successively captured by the image capture section; a first filter acquisition step of acquiring a first filter as a restoration filter which is generated corresponding to a point spread function of an optical system of the image capture section; a second filter acquisition step of acquiring a second filter which is applied to a defocused image of the images successively captured by the image capture section and of which a restoration strength is weaker than a restoration strength of the first filter; an in-focus determination step of determining whether or not a processing target image of the images successively captured by the image capture section is in a target in-focus state, due to the focus adjustment performed by the auto focus adjustment section; and a restoration processing step of performing a restoration processing, which uses at least the second filter acquired by the second filter acquisition step, on the processing target image in case where it is determined in the in-focus determination step that the processing target image is not in the target in-focus state, and performing restoration processing which uses the first filter acquired by the first filter acquisition step, on the processing target image in case where it is determined in the in-focus determination step that the processing target image is in the target in-focus state.

The image processing method according to a nineteenth aspect of the present invention further includes a focusing time estimation step of estimating a focusing time period from when the focus adjustment is started by the auto focus adjustment section to when the target in-focus state is achieved. In the method, it is preferable that, in the restoration processing step, the restoration processing is performed on the processing target image, on the basis of the acquired first and second filters and the estimated focusing time period, in case where it is determined in the in-focus determination step that the processing target image is not in the target in-focus state.

According to the present invention, among the successively captured images, an image, which is not in the target in-focus state, is subjected to the restoration processing through the second filter of which the restoration strength is weak. Hence, image quality is not lowered due to overcorrection and the like. In contrast, an image, which is in the target in-focus state, is subjected to the restoration processing through the first filter as the restoration filter which is generated corresponding to the point spread function of the optical system. Hence, a degraded image is restored to a high-resolution image through the point spread function of the optical system.

BRIEF DESCRIPTION OF THE DRAWINGS

FIGS. 4A and 4B are diagrams illustrating configuration examples of phase difference pixels.

DESCRIPTION OF THE PREFERRED EMBODIMENTS

Hereinafter, referring to accompanying drawings, preferred embodiments of an image capture device and an image processing method according to the present invention will be described in detail.

[Image Capture Device]

Figure 1:
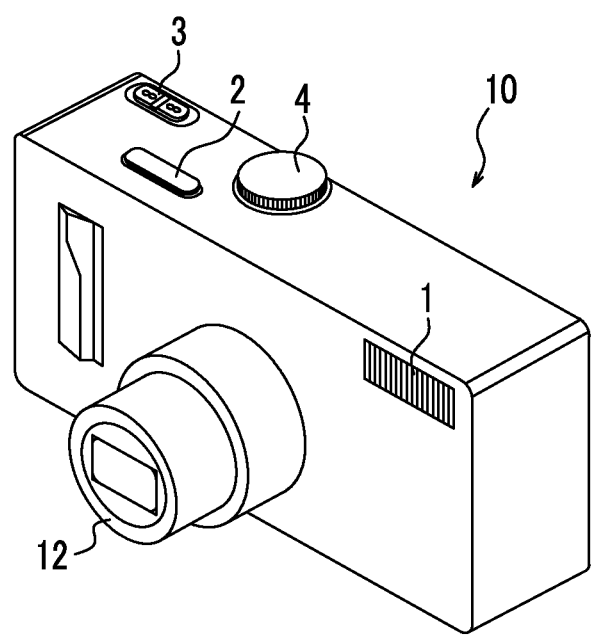
FIG. 1 is a perspective view illustrating an embodiment of an image capture device according to the present invention.
Figure 2:
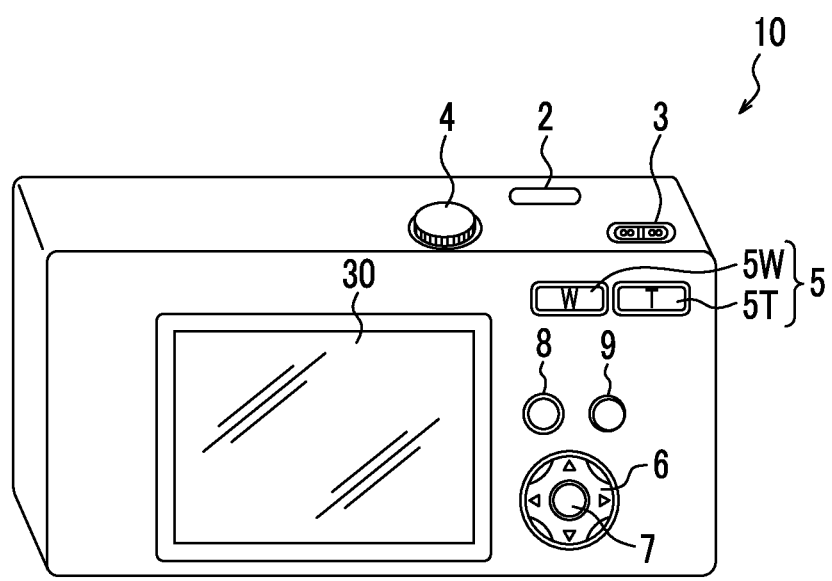
FIG. 2 is a rear view of the image capture device shown in FIG. 1.

FIGS. 1 and 2 are respectively a perspective view and a rear view illustrating an embodiment of an image capture device according to the present invention. The image capture device 10 is a digital camera or a digital video camera that receives light transmitted through a lens from an image capture element, converts the light into a digital signal, and records the signal as image data of a still image or a moving image in a recording medium.

As shown in FIG. 1, in the image capture device 10, a photography lens (optical system) 12, a strobe 1, and the like are arranged on the front side thereof, and a shutter button 2, a power/mode switch 3, a mode dial 4, and the like are arranged on the upper side thereof. On the other hand, as shown in FIG. 2, a liquid crystal monitor 30, a zoom button 5, an arrow button 6, a MENU/OK button 7, a reproducing button 8, a BACK button 9, and the like are arranged on the rear side of the camera.

The photography lens 12 is formed as a collapsible zoom lens so as to be projected from a camera main body by setting a camera mode to a photography mode through the power/mode switch 3. The strobe 1 is for irradiating a main photographic subject with strobe light.

The shutter button 2 is formed as a stroke-type switch which operates in a manner of having two steps which are so-called "pressing halfway (S1 ON)" and "pressing fully (S2 ON)" so as to function as a photography preparation instruction section and function as an image recording instruction section.

In the image capture device 10, recording of a moving image is started when a moving image photography mode is selected as the photography mode and the shutter button 2 is "pressed fully", and the recording stops and remains on standby when the shutter button 2 is "pressed fully" again. Further, when the moving image photography mode is selected, an auto focus adjustment section continuously performs focus adjustment (performs continuous AF based on phase difference AF), and an automatic exposure control section performs exposure control. The auto focus adjustment section includes a lens driving section 36 and an auto focus processing section (AF processing section) 42 to be described later. The automatic exposure control section includes an automatic exposure detection section (AE detection section) 44 and a shutter driving section 33, and a diaphragm driving section 34.

In contrast, in the image capture device 10, a photography preparation operation of performing AF and AE control is started when a still image photography mode is selected as the photography mode and the shutter button 2 is "pressed halfway", and image capturing and recording of a still image are performed when the shutter button 2 is "pressed fully".

The power/mode switch 3 has both a function as a power switch for turning on/off power of the image capture device 10 and a function as a mode switch for setting a mode of the image capture device 10, and is disposed to slide between an "OFF position", a "reproduction position", and a "photography position". In the image capture device 10, power is turned on by sliding and adjusting the power/mode switch 3 to the "reproduction position" or the "photography position", and power is turned off by adjusting the switch to the "OFF position". Then, the "reproduction mode" is set by adjusting and sliding the power/mode switch 3 to the "reproduction position", and the "photography mode" is set by adjusting the switch to the "photography position".

The mode dial 4 functions as photography mode setting means that sets the photography mode of the image capture device 10. The photography mode of the stereoscopic image capture device 10 is set to various modes in accordance with the setting position of this mode dial 4. For example, there are a "still image photography mode" to capture a still image, a "moving image photography mode" to capture a moving image, and the like.

The liquid crystal monitor 30 displays a live view image in the photography mode, that is, a through-the-lens image, and displays a still image or a moving image in the reproduction mode, and displays a menu screen and the like, thereby functioning as a part of a graphical user interface (GUI).

The zoom button 5 functions as zoom instruction means configured to give instructions to perform zooming. The zoom button 5 includes a telephoto button 5T that gives an instruction to perform zooming to the telephoto side and a wide button 5W that gives an instruction to perform zooming to the wide angle side. When the image capture device 10 is in the photography mode, if the telephoto button 5T and the wide button 5W are operated, the focal length of the photography lens 12 changes. Moreover, if the telephoto button 5T and the wide button 5W are operated in the reproduction mode, an image, which is being reproduced, is enlarged or reduced.

The arrow button 6 is a multi-function button to input instructions of four directions of up, down, right, and left, and functions as a button (cursor movement operation means) that selects an item from a menu screen or gives an instruction to select various setting items from each menu. The right/left key functions as a frame advance (forward-direction/opposite-direction advance) button in the reproduction mode.

The MENU/OK button 7 is an operation button having both a function as a menu button to give a command to display a menu on the screen of the liquid crystal monitor 30 and a function as an OK button to give a command to confirm and execute selected contents.

The reproducing button 8 is a button to switch to a reproduction mode to display a captured and recorded still image or moving image on the liquid crystal monitor 30.

The BACK button 9 functions as a button to give an instruction to cancel the input operation or return to the previous operation state.

[Internal Configuration of Image Capture Device]

Figure 3:
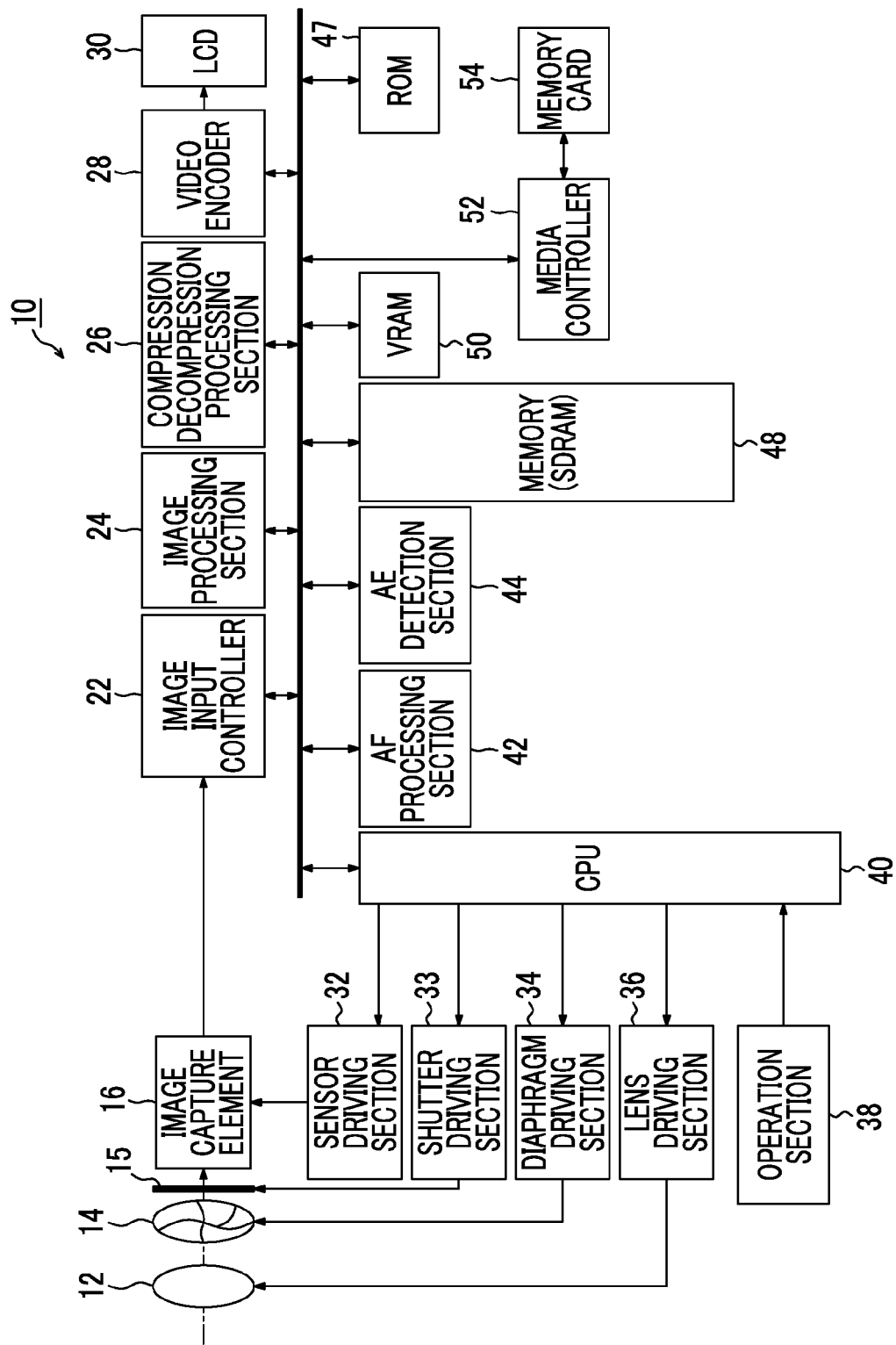
FIG. 3 is a block diagram illustrating an embodiment of an internal configuration of the image capture device shown in FIG. 1.

FIG. 3 is a block diagram illustrating an embodiment of an internal configuration of the image capture device 10. This image capture device 10 records a captured image in a memory card 54, and the entire device operation is integrally controlled by a central processing unit (CPU) 40.

The image capture device 10 is provided with an operation section 38 that includes the shutter button 2, the power/mode switch 3, the mode dial 4, the telephoto button 5T, the wide button 5W, the arrow button 6, the MENU/OK button 7, the reproducing button 8, and the BACK button 9. A signal from this operation section 38 is input to the CPU 40, and the CPU 40 controls each circuit of the image capture device 10 on the basis of the input signal. For example, the CPU 40 performs control to drive an image capture element (image sensor) 16, lens drive control, diaphragm drive control, photography operation control, image processing control, control to record and reproduce image data, and control to perform display on the liquid crystal monitor 30, and the like.

When power of the image capture device 10 is turned on by the power/mode switch 3, power is fed from a power supply section, which is not shown, to each block, and the driving of the image capture device 10 is started.

Rays, which pass through the photography lens 12, the diaphragm 14, a mechanical shutter 15, and the like, are imaged on the image capture element 16 which is a complementary-metal-oxide-semiconductor (CMOS) type color image sensor. In addition, the image capture element 16 is not limited to the CMOS type, and may be an XY address type, or a charge-coupled-device (CCD) type color image sensor.

The image capture element 16 is formed of a plurality of pixels arranged in a matrix shape of a predetermined pattern array (such as a Bayer array, a G stripe R/G full checkered array, an X-Trans (registered trademark) array, or a honeycomb array). Each pixel is configured to include a microlens, a red (R), green (G) or blue (B) color filter CF, and a photodiode (PD).

The image capture element 16 of the present example includes phase difference pixels for phase difference AF shown in FIGS. 4A and 4B.

FIGS. 4A and 4B are enlarged main part views respectively illustrating configurations of a first phase difference pixel p1 and a second phase difference pixel p2.

As shown in FIG. 4A, a light blocking member 16A is disposed on the front surface side (microlens L side) of a photodiode (PD) of the first phase difference pixel p1. On the other hand, as shown in FIG. 4B, a light blocking member 16B is disposed on the front surface side of the photodiode (PD) of the second phase difference pixel p2. The microlens L and the light blocking members 16A and 16B have a function as pupil division means. As shown in FIG. 4A, the light blocking member 16A blocks the light in the left half of the light receiving surface of the photodiode (PD). Therefore, the first phase difference pixel p1 receives the rays only on the left side with respect to the optical axis among rays that have passed through the exit pupil of the photography lens 12. As shown in FIG. 4B, the light blocking member 16B blocks the light in the right half of the light receiving surface of the photodiode (PD) of the second phase difference pixel p2. Therefore, the second phase difference pixel p2 receives the rays only on the right side with respect to the optical axis among rays that have passed through the exit pupil of the photography lens 12. As described above, the rays, which pass through the exit pupil, are divided toward the right and left through the light blocking members 16A and 16B and the microlens L as pupil division means, and the divided rays are respectively incident into the first phase difference pixel p1 and the second phase difference pixel p2.

Figure 5:
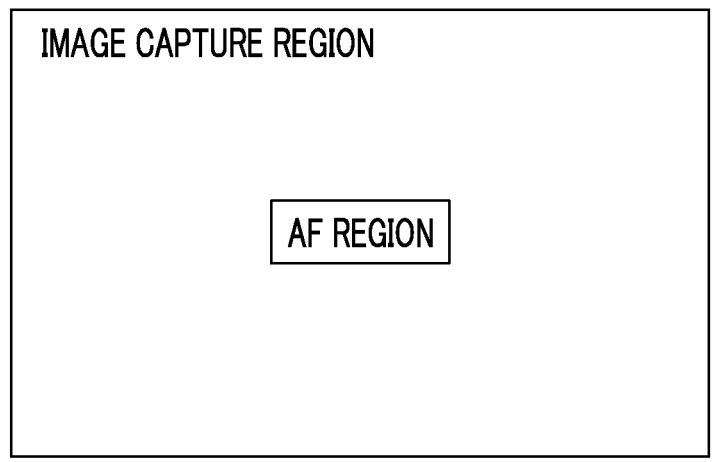
FIG. 5 is a diagram illustrating an AF region and an image capture region of the image capture element.

The first phase difference pixel p1 and the second phase difference pixel p2 are, as shown in FIG. 5, provided in an AF region (in-focus region) at the central portion in an image capture region of the image capture element 16. It is preferable that about several tens to one hundred of the first phase difference pixels p1 and the second phase difference pixels p2 are arranged in the phase difference detection direction, that is, the horizontal direction in the present embodiment. It is also preferable that a plurality of pairs of phase difference pixels is arranged in the vertical direction.

Figure 6A:
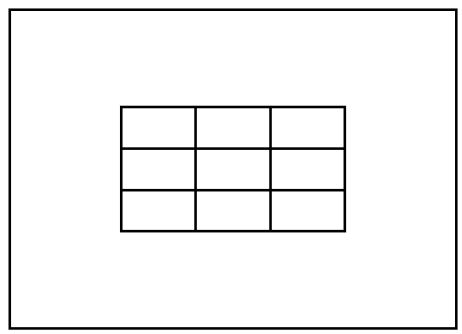
FIGS. 6A, 6B, and 6C are diagrams illustrating other embodiments of AF regions.
Figure 6B:
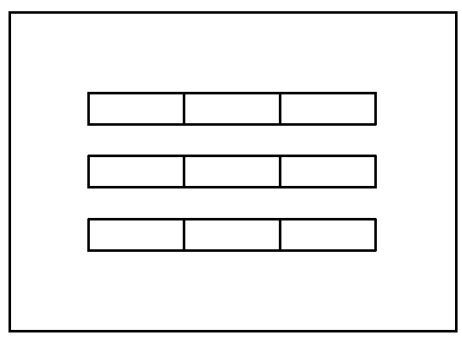
Figure 6C:
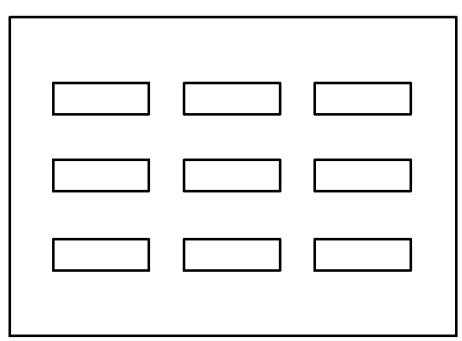

The AF region is not limited to the example shown in FIG. 5. As shown in FIGS. 6A, 6B, and 6C, a plurality of AF regions may be discretely provided in the image capture region of the image capture element 16, and may be provided in the entire image capture region.

Returning to FIG. 3, the CPU 40 constantly performs AF and AE operations during image capturing and recording (image recording) of a moving image and during image capturing and displaying of a live view image.

An AF processing section 42 is a section which performs a phase difference AF process, and detects the phase difference by using each output signal of the phase difference pixel p1 and the second phase difference pixel p2 shown in FIGS. 4A and 4B.

That is, the AF processing section 42 extracts the image data (output data) of the first phase difference pixel p1 and the second phase difference pixel p2 in the AF region from image data corresponding to a single frame, and detects the phase difference between the output data of the first phase difference pixel p1 and the output data of the phase difference pixel p2. For example, the phase difference is acquired from the amount of shift in the lateral direction between pieces of output data when the correlation between pieces of output data of one upper/lower pair of the first phase difference pixel p1 and the second phase difference pixel p2 is at a maximum (when the sum value of absolute values of differences between pieces of output data of the upper/lower pair of the phase difference pixels is at a minimum).

The CPU 40 calculates an amount of deviation (amount of defocus) in the optical axis direction between a focus position of the photography lens 12 and an imaging plane of the image capture element 16 on the basis of the phase difference data detected by the AF processing section 42.

When phase difference data indicating a phase difference is input from the AF processing section 42, the CPU 40 functions as focus adjustment means for performing the phase difference AF on the basis of the phase difference data. That is, the CPU 40 calculates an amount of deviation (amount of defocus) between the focus position of the photography lens 12 and the imaging plane of the image capture element 16 on the basis of the phase difference data, and moves the focus lens in the photography lens 12 through a lens driving section 36 such that the calculated amount of defocus enters a range of a depth of focus. The amount of defocus may be calculated by the AF processing section 42. Subsequently, if the shutter button 2 is "pressed fully", the CPU 40 starts photography and recording (image recording) of a moving image.

If the photography mode is the moving image photography mode, the CPU 40 inputs the phase difference data, which indicates the phase difference, from the AF processing section 42 for each of the images (for each one frame) continuously captured or for each of a predetermined number of frames, and performs the phase difference AR The phase difference AF moves the focus lens within the photography lens 12 through the lens driving section 36 such that the amount of defocus calculated on the basis of the phase difference data enters the range of the depth of focus. In this case, since the phase difference data is input for each one frame or for each of the predetermined number of frames, the phase difference AF is constantly performed (the continuous AF is performed). That is, in the moving image photography mode, the mechanical shutter 15 is opened, image data is continuously read from the image capture element 16 with a predetermined frame rate (for example, a frame rate of 30 frames/sec., or 60 frames/sec.), the phase difference AF is continuously performed, the luminance of the photographic subject is calculated, and the diaphragm 14 is controlled by the diaphragm driver 34.

The reference number 47 indicates a read-only memory (ROM) or an electrically erasable programmable read-only memory (EEPROM) that stores a camera control program, information on defects in the image capture element 16, and various parameters and tables used for image processing and the like. In the present example, the ROM 47 stores first and second filters which are restoration filters generated corresponding to the point spread function (PSF) of the photography lens 12.

RGB image data (mosaic image data), which is output from the image capture element 16 at the time of capturing a moving image or a still image, is input from an image input controller 22 to a memory (Synchronous Dynamic Random Access Memory: SDRAM) 48, and is temporarily stored therein.

The image data, which is temporarily stored in the memory 48, is appropriately read by the image processing section 24, and is therein subjected to signal processing. The signal processing includes offset processing, gain control processing including white balance correction and sensitivity correction, gamma correction processing, demosaic processing (demosaicing processing), RGB/YC conversion processing, restoration processing according to the present invention, and the like. In addition, the image processing section 24 will be described later in detail.

The image data processed by the image processing section 24 is input to a video RAM (VRAM) 50. The VRAM 50 includes an A region and a B region each of which stores image data indicating an image corresponding to one frame. Image data indicating the image corresponding to one frame is alternately rewritten in the A region and the B region in the VRAM 50. Written image data is read from a region, which is other than that where image data is being rewritten, between the A region and the B region of the VRAM 50.

The image data, which is read from the VRAM 50, is encoded by a video encoder 28, and output to the liquid crystal monitor 30 provided on the rear surface of the camera, thereby allowing a live view image to be continuously displayed on the display screen of the liquid crystal monitor 30.

A compression decompression processing section 26 performs compression processing on luminance data Y and color difference data Cb and Cr, which are processed by the image processing section 24 and temporarily stored in the memory 48, at the time of recording the moving image or the still image. In the case of the moving image, the data pieces are compressed on the basis of, for example, the H.264 format. In the case of the still image, the data pieces are compressed on the basis of, for example, the joint photographic coding experts group (JPEG) format. The compressed image data, which is compressed by the compression decompression processing section 26, is recorded in the memory card 54 through a media controller 52.

The compression decompression processing section 26 performs decompression processing on the compressed image data which is obtained from the memory card 54 through the media controller 52 in the reproduction mode. The media controller 52 performs recording, reading, and the like of the compressed image data on the memory card 54.

<Image Processing>

Figure 7:
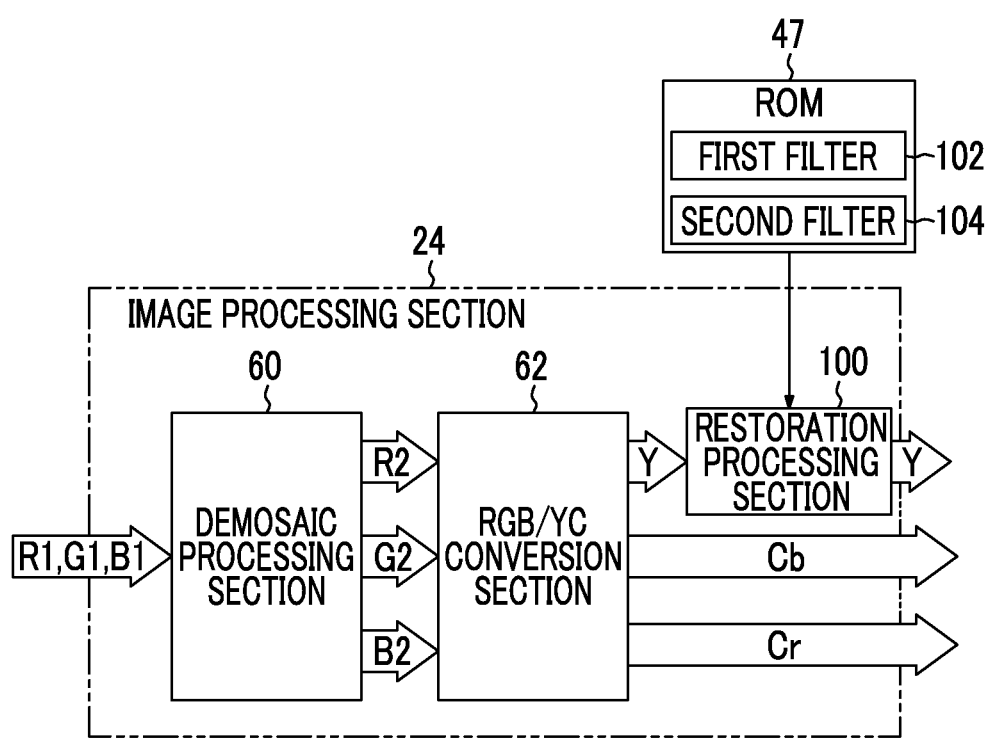
FIG. 7 is a main section block diagram illustrating an embodiment of an image processing section of the image capture device shown in FIG. 3.

FIG. 7 is a main section block diagram illustrating an embodiment of the image processing section 24 of the image capture device 10 shown in FIG. 3.

As shown in FIG. 7, the image processing section 24 mainly has a demosaic processing section 60, an RGB/YC conversion section 62, and a restoration processing section 100. In addition, the image processing section 24 also has processing sections that perform white balance correction processing, gamma correction processing, edge enhancement processing, and the like. However, figures and description of these processing sections will be omitted.

The demosaic processing section 60 is a section that performs the demosaic processing. Here, the demosaic processing is processing of calculating information of all colors for each pixel from the mosaic image corresponding to a color filter array of a single-plate-type color image capture element, and is also referred to as synchronization processing. For example, in the case of the image capture element having color filters of three colors of RGB, the demosaic processing is processing of calculating information of all colors of RGB for each pixel from the mosaic image having RGB colors.

The demosaic processing section 60 receives inputs of image data R1, G1, and B1 of respective colors of RGB obtained through image capturing of the image capture element 16. The demosaic processing section 60 performs demosaic processing on the input image data R1, G1, and B1, and generates RGB image data R2, G2, and B2 constituted of color data of three aspects of RGB.

The RGB/YC conversion section 62 performs the RGB/YC conversion processing on RGB image data R2, G2, and B2 which are input from the demosaic processing section 60, and generates the luminance data Y and the color difference data Cb and Cr. The luminance data Y is generated on the basis of, for example, an expression of [Y=0.3R+0.6G+0.1B]. Here, in the present embodiment, as an example of the luminance data Y, a value of a luminance signal of a color space indicated by "Y, Cb, and Cr" is described. However, the luminance data Y is not particularly limited as long as it is data contributing to a luminance of an image, and means various kinds of data having information on the luminance of a captured image. Examples of the luminance data Y include: data that indicates the luminance in the CIELAB color space; data that most contributes to acquisition of the luminance signal; data that corresponds to color filters of colors which most contribute to the luminance; and the like.

A restoration processing section 100 reads a first filter 102 and a second filter 104 stored in the ROM 47, and performs the restoration processing on the luminance data Y through the first filter 102 and the second filter 104. The restoration processing is performed only on the luminance data Y, which has a great visual effect, in order to reduce a load of the calculation processing. By performing the restoration processing, as shown in FIG. 8, blurring of the image is corrected.

Figure 8:
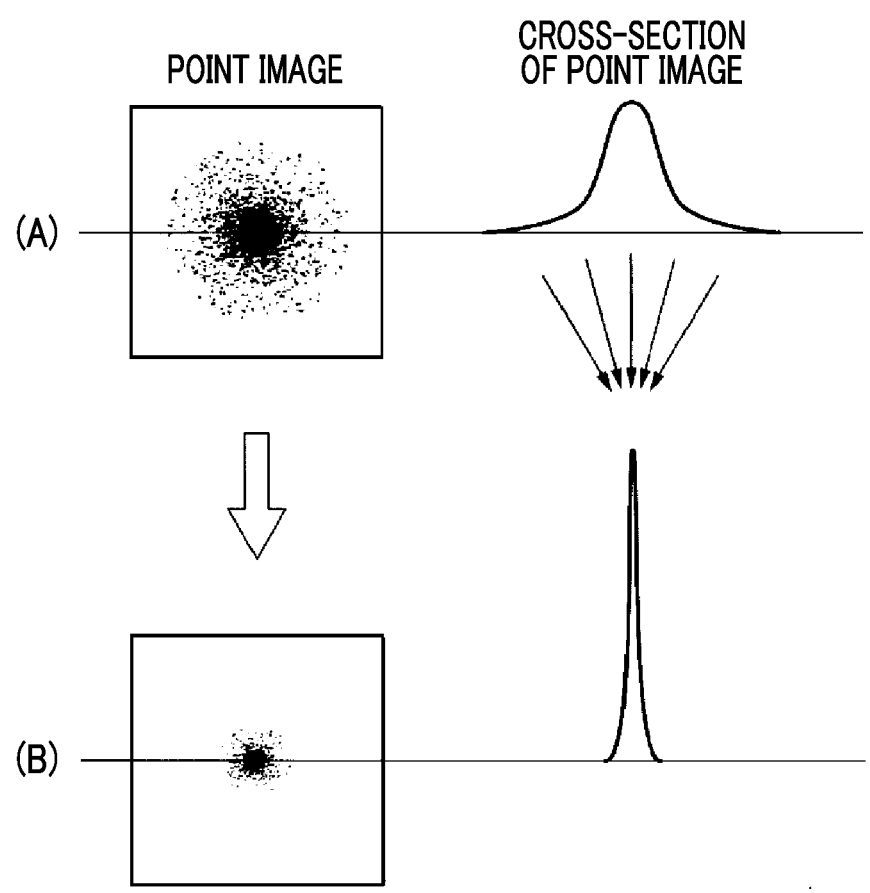
FIG. 8 is a diagram used for explaining restoration processing.

As shown in (A) of FIG. 8, a point image (optical image), which passes through the photography lens 12, is formed as a large-size point image (blurred image) on the image capture surface of the image capture element 16. However, through the restoration processing, the point image is restored to a small-size point image shown in (B) of FIG. 8, that is, a high-resolution image.

[Restoration Processing]
<First Embodiment>

Next, a first embodiment of the restoration processing device within the image capture device 10 will be described.

Figure 9:
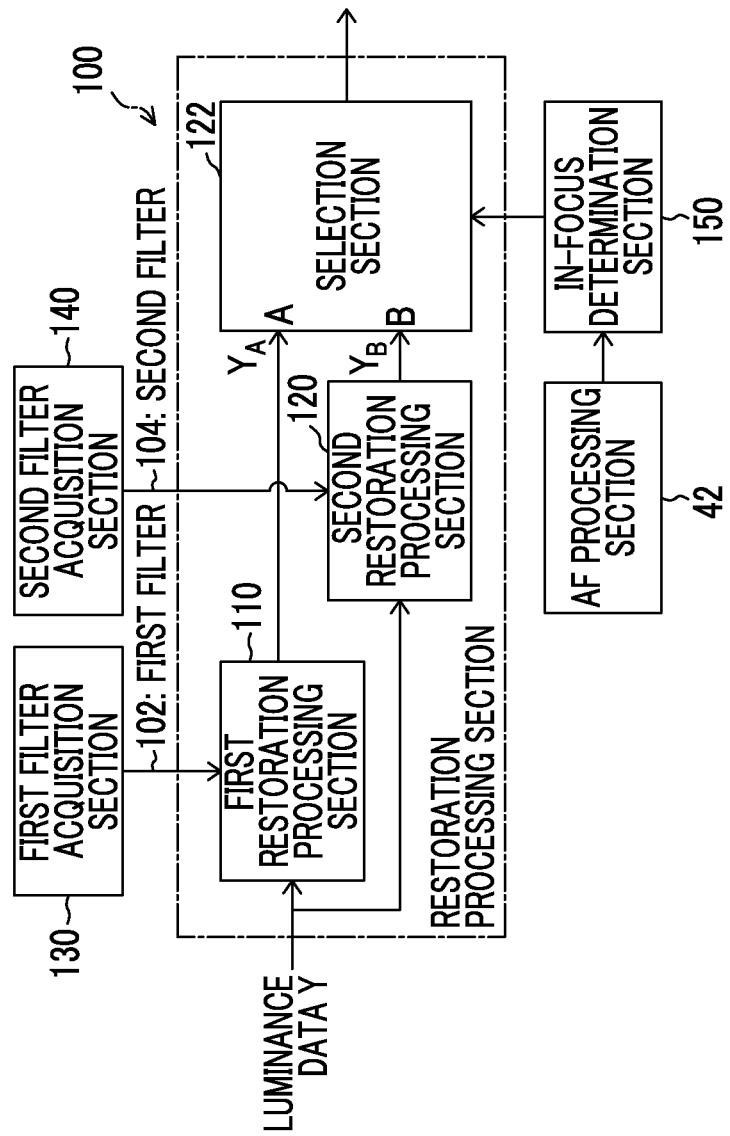
FIG. 9 is a main section block diagram illustrating a first embodiment of a restoration processing device.

FIG. 9 is a main section block diagram illustrating the first embodiment of the restoration processing device. The restoration processing device mainly includes the restoration processing section 100 shown in FIG. 7, a first filter acquisition section 130, a second filter acquisition section 140, and an in-focus determination section 150.

The restoration processing section 100 further includes a first restoration processing section 110, a second restoration processing section 120, and a selection section 122.

The first restoration processing section 110 is a section that performs the restoration processing on the luminance data Y added from the RGB/YC conversion section 62 (FIG. 7), and the first filter 102 is added to another input from the first filter acquisition section 130.

Here, the first filter 102 is, for example, a restoration filter (optimized filter) which is formed of a deconvolution kernel (corresponding to a number of taps of M=7 and N=7) having a kernel size of 7×7 and calculation coefficients (corresponding to restoration gain data and a filter coefficient) corresponding to the deconvolution kernel and which is generated on the basis of the point spread functions (PSF, OTF, MTF, PTF, and the like) corresponding to photography conditions (a diaphragm value (F number), an angle of view (image height), a zoom ratio, a photographic subject distance, and the like) of the photography lens 12. Specifically, $PSF_R(x, y)$, $PSF_G(x, y)$, and $PSF_B(x, y)$ of respective RGB colors of the photography lens 12 are mixed using an appropriate weighting coefficient, thereby creating $PSF_Y(x, y)$ for the luminance data Y. By using these $PSF_Y(x, y)$, the restoration filter for performing the restoration processing on the luminance data Y is generated. Here, (x, y) indicates a position within the screen of the image capture element 16. In addition, the kernel size of the deconvolution kernel is not limited to the size of 7×7, and various sizes may be applied.

Generally, a convolution-type Wiener filter can be used in the restoration of blurring performed through PSF. Referring to information of a SN ratio and an OTF which is obtained through Fourier transform on the $PSF_Y(x, y)$, frequency characteristics $d(\omega_x, \omega_y)$ of the restoration filter can be calculated through the following expression.

$$d(\omega_x, \omega_y) = \frac{H^*(\omega_x, \omega_y)}{\|H(\omega_x, \omega_y)\|^2 + 1/SNR(\omega_x, \omega_y)}$$ [Numerical Expression 1]

Here, $H(\omega_x, \omega_y)$ indicates OTF, and $H^*(\omega_x, \omega_y)$ indicates a complex conjugate thereof. Further, $SNR(\omega_x, \omega_y)$ indicates the SN ratio.

The filter coefficient of the restoration filter is designed in terms of optimization for selecting a coefficient value such that the coefficient is most approximate to desired Wiener frequency characteristics, and the filter coefficient is appropriately calculated in accordance with an arbitrary known method.

In the present example, the restoration filter, which is created as described above, is stored as the first filter 102 in the ROM 47.

Since the PSF changes in accordance with a diaphragm value (F number), an angle of view (image height), a zoom ratio, a photographic subject distance, a type of the lens, and the like, multiple first filters 102 are provided. In the present embodiment, the ROM 47 stores at least the first filters 102 which include a plurality of restoration filters (optimized filters) generated on the basis of a PSF compliant with a plurality of photographic subject distances.

The first filter acquisition section 130 reads the first filters 102 which correspond to a position (image height) of the luminance data Y to be subjected to the restoration processing in the screen and image capture conditions (an F number, a diaphragm value, and the like), and outputs the read first filters 102 to the first restoration processing section 110.

The first restoration processing section 110 performs convolution on luminance data having a kernel size of 7×7 including the luminance data Y of the restoration processing target and the first filter 102 which is input from the first filter acquisition section 130, and outputs the luminance data $Y_A$ subjected to the restoration processing as a result of the convolution in response to an input A of the selection section 122.

In contrast, the second restoration processing section 120 is a section that performs the restoration processing on the luminance data Y added from the RGB/YC conversion section 62, and the second filter 104 is added to another input from the second filter acquisition section 140.

Here, the second filter 104 is, for example, a moderate filter having a kernel size of 7×7. In addition, as the second filter 104, it is possible to use a filter which is less effective in terms of point image restoration, that is, a filter which is unlikely to cause artifacts and has any feature of the following filters.

Available filters include:
(1) an edge enhancement filter which performs moderate edge enhancement;
(2) a restoration filter in which a modulation transfer function (MTF) after restoration is not greater than 1.0 (the MTF after restoration may be greater than 1.0 in accordance with RGB colors in the case of the first filter 102 for the luminance data Y);
(3) a zero phase filter (which includes a filter that does not include movement of an image depending on the frequency and a restoration filter that performs phase restoration);
(4) a restoration filter which is generated corresponding to the PSF of a region in which aberration of the optical system is the minimum;
(5) a filter which has smooth frequency characteristics and is unlikely to cause ringing since large filter coefficients are concentrated in the vicinity of the center of the kernel;
(6) a filter which has 1 at the center of the kernel and 0 at positions other than the center (a filter which outputs input data as it is); and
(7) a filter of which a restoration strength is lower than that of the first filter.

In addition, the second filter 104 is not limited to the above-mentioned filters. In fact, any filter may be used as long as it is unlikely to cause artifacts. Further, examples of "(7) the filter of which the restoration strength is lower than that of the first filter" include a filter of which the restoration strength is 0, that is, a filter in a case where control is performed such that the restoration processing is not performed.

The second filter 104 having the above-mentioned feature may be a filter (common filter) which is used in common for a plurality of photography conditions regardless of each of the photography conditions (the diaphragm value (F number), the angle of view (image height), the zoom ratio, the photographic subject distance and the like) of the photography optical system. In particular, by using such a filter (common filter) that makes a predetermined evaluation indicator of artifacts equal to or less than a threshold value regardless of the photographic subject distance even when the filter is used in common for a plurality of photographic subject distances, image quality is prevented from being lowered through overcorrection and the like even when the restoration processing is performed on an image which is not in an in-focus state.

The second restoration processing section 120 performs convolution on luminance data having a kernel size of 7×7 including the luminance data Y of the restoration processing target and the second filter 104 which is input from the second filter acquisition section 140, and outputs the luminance data $Y_B$ as a result of the convolution in response to an input B of the selection section 122.

The selection section 122 selects and outputs either one of the luminance data $Y_A$ and $Y_B$ added to the inputs A and B, on the basis of a selection command signal which is output from the in-focus determination section 150.

The in-focus determination section 150 inputs an amount of defocus from the AF processing section 42, and determines whether or not the currently captured image (processing target image) is in a target in-focus state on the basis of whether or not the amount of defocus is in a range of the depth of focus. Then, the in-focus determination section 150 outputs a selection command signal for selecting the luminance data $Y_A$ of the input A to the selection section 122 if it is determined that the currently captured image is in the target in-focus state, and outputs a selection command signal for selecting the luminance data $Y_B$ of the input B to the selection section 122 if it is determined that the currently captured image is not in the target in-focus state.

That is, in the first embodiment of the restoration processing device, in a case of the image which is in the target in-focus state among the successively captured images in the moving image photography mode, the image (luminance data $Y_A$), which is restored through the first filter 102, is output. In a case of the image which is not in the in-focus state, the image (luminance data $Y_B$), which is restored through the second filter 104, is output.

Thereby, the image, which is in the target in-focus state, is subjected to the restoration processing through the first filter. Accordingly, a degraded image corresponding to the PSF of the photography lens 12 can be restored to a high-resolution image. In contrast, the image, which is not in the target in-focus state, is subjected to the restoration processing through the second filter of which the restoration strength is weak. Accordingly, image quality is not lowered through overcorrection and the like.

Figure 10:
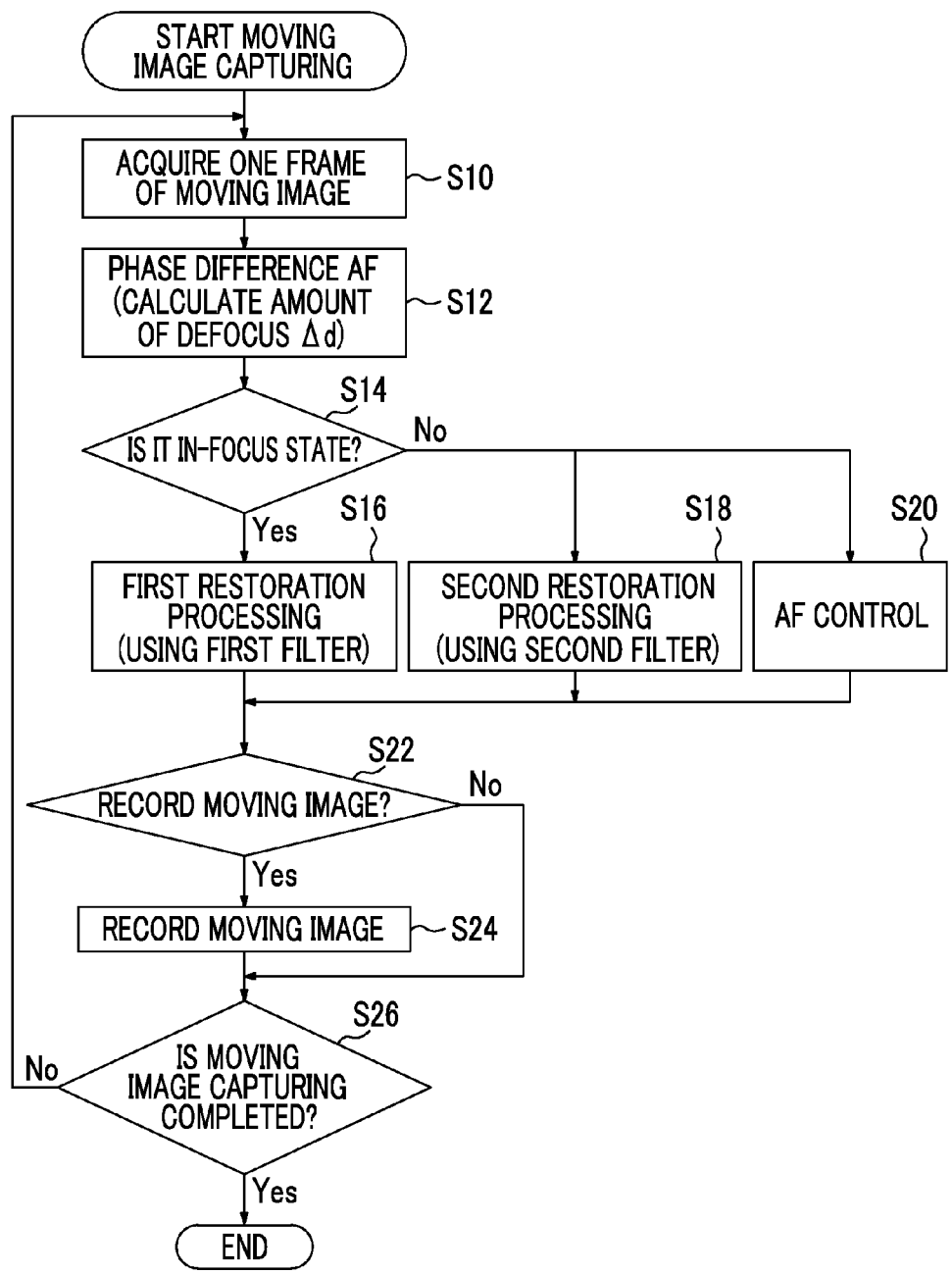
FIG. 10 is a flowchart illustrating an image processing method corresponding to the first embodiment.

FIG. 10 is a flowchart illustrating an image processing method corresponding to the first embodiment. In particular, FIG. 10 shows the restoration processing at the time of capturing a moving image.

As shown in FIG. 10, in the moving image photography mode, the CPU 40 drives the photography lens 12, the diaphragm 14, and the image capture element 16 (image capture section) such that a moving image is captured, and acquires one frame (image corresponding to one frame) of the moving image (step S10, an image acquisition step). The AF processing section 42 calculates an amount of defocus Δd on the basis of phase pixels within the acquired image (step S12).

The in-focus determination section 150 determines whether or not the calculated amount of defocus Δd is in the range of the depth of focus (whether or not the in-focus state is achieved) (step S14, an in-focus determination step). In step S14, if it is determined that the in-focus state is achieved (if "Yes"), the process advances to step S16. In step S16, the first filter acquisition section 130 acquires the first filter 102 (a first filter acquisition step), and the first restoration processing section 110 performs the restoration processing on the acquired image through the first filter 102 (a restoration processing step).

In contrast, in step S14, if it is determined that the in-focus state is not achieved (if "No"), the process advances to step S18. In step S18, the second filter acquisition section 140 acquires the second filter 104 (a second filter acquisition step), and the second restoration processing section 120 performs the restoration processing on the acquired image through the second filter 104 (a restoration processing step). Further, since it is determined that the in-focus state is not achieved, in conjunction with the process of step S18, AF control is performed such that the amount of defocus Δd enters the range of the depth of focus (step S20, an auto focus adjustment step).

Next, it is determined whether or not the moving image is recorded (step S22). That is, in the moving image photography mode, if the shutter button 2 is "pressed fully", an instruction to record the moving image is received, and if the shutter button 2 is "pressed fully" again, the moving image recording is on standby. In step S22, if it is determined that the moving image is recorded, the process advances to step S24, and processing of recording the moving image is performed.

Subsequently, it is determined whether or not the moving image photography is completed (step S26). The completion determination of the moving image photography is performed depending on whether or not power is turned off by the power/mode switch 3 or the current mode is switched to the reproduction mode.

If it is determined that the moving image photography is not completed, the process advances to step S10, the next single frame of the moving image is acquired, and steps S12 to S26 are repeated. If it is determined that the moving image photography is completed, the photography/recording processing of the moving image is completed.

Even in the standby state of the moving image recording, a moving image is captured, and the restored moving image is displayed as a live view image on the liquid crystal monitor 30.

<Second Embodiment>

Next, a second embodiment of the restoration processing device within the image capture device 10 will be described.

Figure 11:
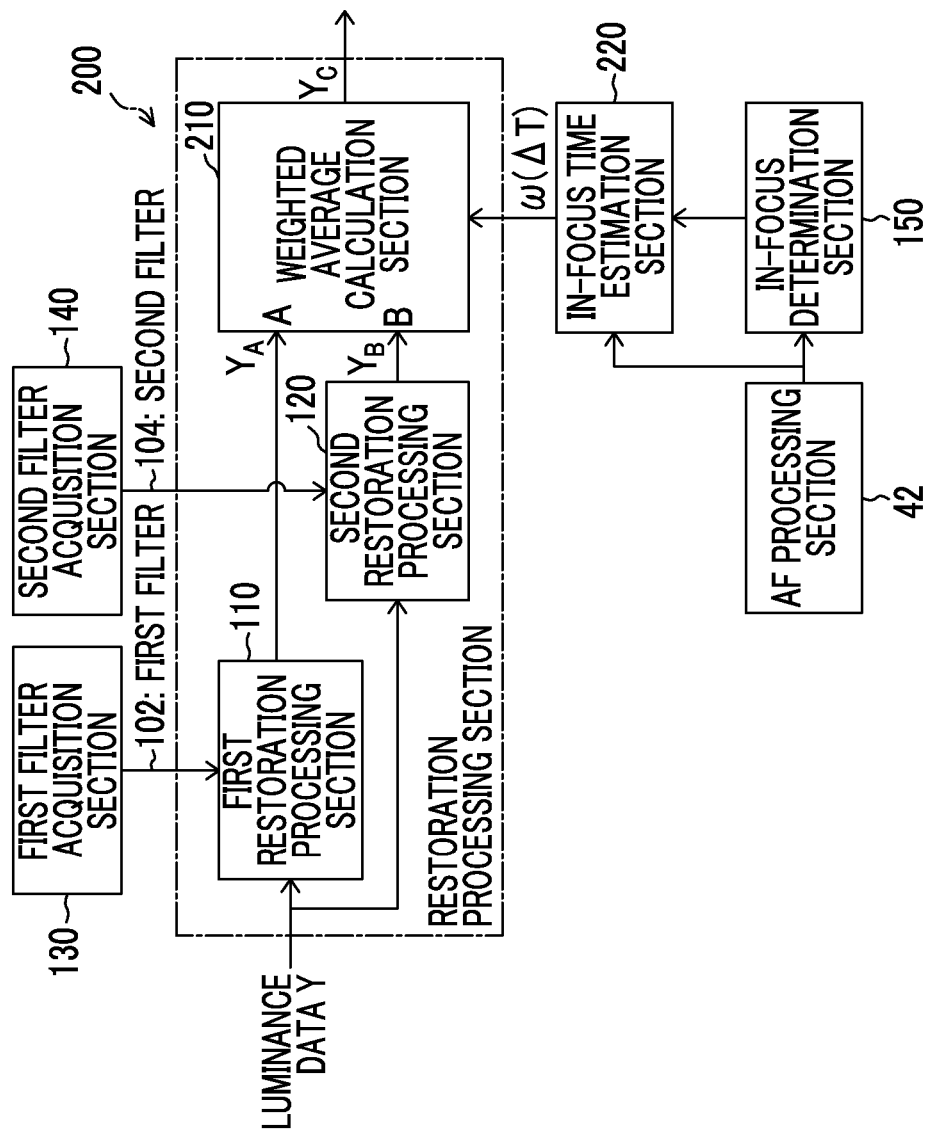
FIG. 11 is a main section block diagram illustrating a second embodiment of a restoration processing device.

FIG. 11 is a main section block diagram illustrating the second embodiment of the restoration processing device. In FIG. 11, elements the same as those in the first embodiment shown in FIG. 9 will be represented by the same reference numerals and signs, and a detailed description thereof will be omitted from discussion.

The restoration processing device of the second embodiment shown in FIG. 11 mainly includes: a restoration processing section 200 which is a modification example of the restoration processing section 100 shown in FIG. 7; the first filter acquisition section 130; the second filter acquisition section 140; the in-focus determination section 150; and the focusing time estimation section 220.

The restoration processing section 200 further includes the first restoration processing section 110, the second restoration processing section 120, and a weighted average calculation section 210.

The restoration processing device of the second embodiment performs processing of smoothly connecting the image, which is restored through the second filter 104, and the image, which is restored through the first filter 102, in accordance with the in-focus state.

The focusing time estimation section 220 is operable if the in-focus determination section 150 determines that the image (processing target image) at the current time point is not in the target in-focus state, and estimates a time period (focusing time period), which will elapse before the amount of defocus enters the range of the depth of focus, on the basis of the amount of defocus which is input from the AF processing section 42. For example, a relationship between an amount of defocus $\Delta d$ and a focusing time period $\Delta T$, which will elapse before the amount of defocus enters the range of the depth of focus, at the amount of defocus $\Delta d$ may be measured and stored as a table in advance, and the corresponding focusing time period $\Delta T$ may be read on the basis of the amount of defocus $\Delta d$ which is input from the AF processing section 42.

Figure 12:
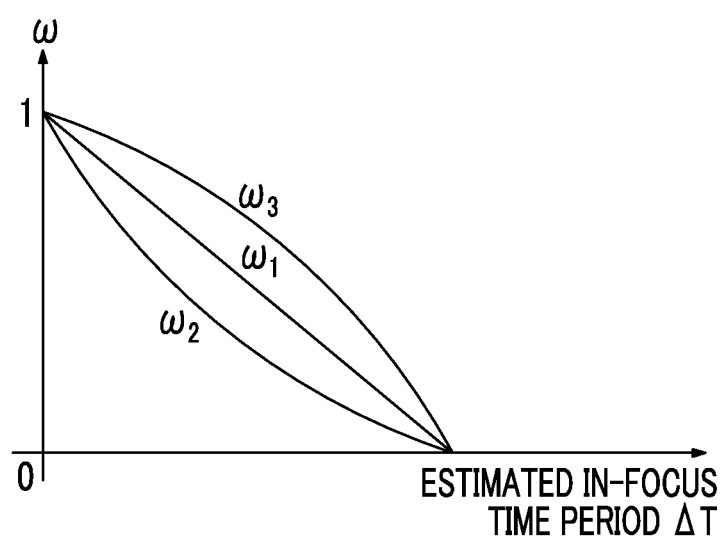
FIG. 12 is a diagram used for explaining a weight coefficient for weighted average calculation.

The focusing time estimation section 220 outputs a weight coefficient $\omega(\Delta T)$ corresponding to the estimated focusing time period $\Delta T$ to the weighted average calculation section 210. For example, as shown in FIG. 12, there is provided a function $\omega 1$, $\omega 2$, or $\omega 3$ of the weight coefficient corresponding to the focusing time period $\Delta T$ ($0 \leq \omega 1$, $\omega 2$, $\omega 3 \leq 1$), the weight coefficient $\omega(\Delta T)$ is calculated on the basis of the estimated focusing time period $\Delta T$, and the calculated weight coefficient $\omega(\Delta T)$ is output to the weighted average calculation section 210.

The weighted average calculation section 210 calculates a weighted average value (luminance data $Y_C$) through the following expression, on the basis of the luminance data $Y_A$ calculated by the first restoration processing section 110, the luminance data $Y_B$ calculated by the second restoration processing section 120, and the weight coefficient $\omega(\Delta T)$ which is input from the focusing time estimation section 220.

$$Y_C = \omega(\Delta T) \times Y_A + (1 - \omega(\Delta T)) \times Y_B \quad \text{[Numerical Expression 2]}.$$

The weighted average calculation section 210 outputs the luminance data $Y_C$ calculated as described. In addition, if the in-focus determination section 150 determines that the image at the current time point is in the target in-focus state, the weight coefficient $\omega(\Delta T)$ is 1. Thus, the luminance data $Y_A$, which is calculated by the first restoration processing section 110, is output as the luminance data $Y_C$ as it is.

Thereby, the image, which is in the target in-focus state, is subjected to the restoration processing through the first filter. Accordingly, a degraded image corresponding to the PSF of the photography lens 12 can be restored to a high-resolution image. Meanwhile, by changing a time period from the blurred state to the in-focus state and a weight at the time of weighted averaging, smoothly connected restored images can be generated.

In the second embodiment, the focusing time period $\Delta T$, which will elapse before the amount of defocus $\Delta d$ enters the range of the depth of focus, is estimated on the basis of the detected amount of defocus $\Delta d$, and thereby the weight coefficient $\omega(\Delta T)$ is calculated on the basis of the estimated focusing time period $\Delta T$. The method of calculation is not limited to this, and the weight coefficient $\omega(\Delta T)$ corresponding to the detected amount of defocus $\Delta d$ may be directly calculated on the basis of the detected amount of defocus $\Delta d$. Consequently, when the detected amount of defocus $\Delta d$ is smaller, the weight coefficient $\omega(\Delta T)$ of the luminance data $Y_A$ is larger.

Figure 13:
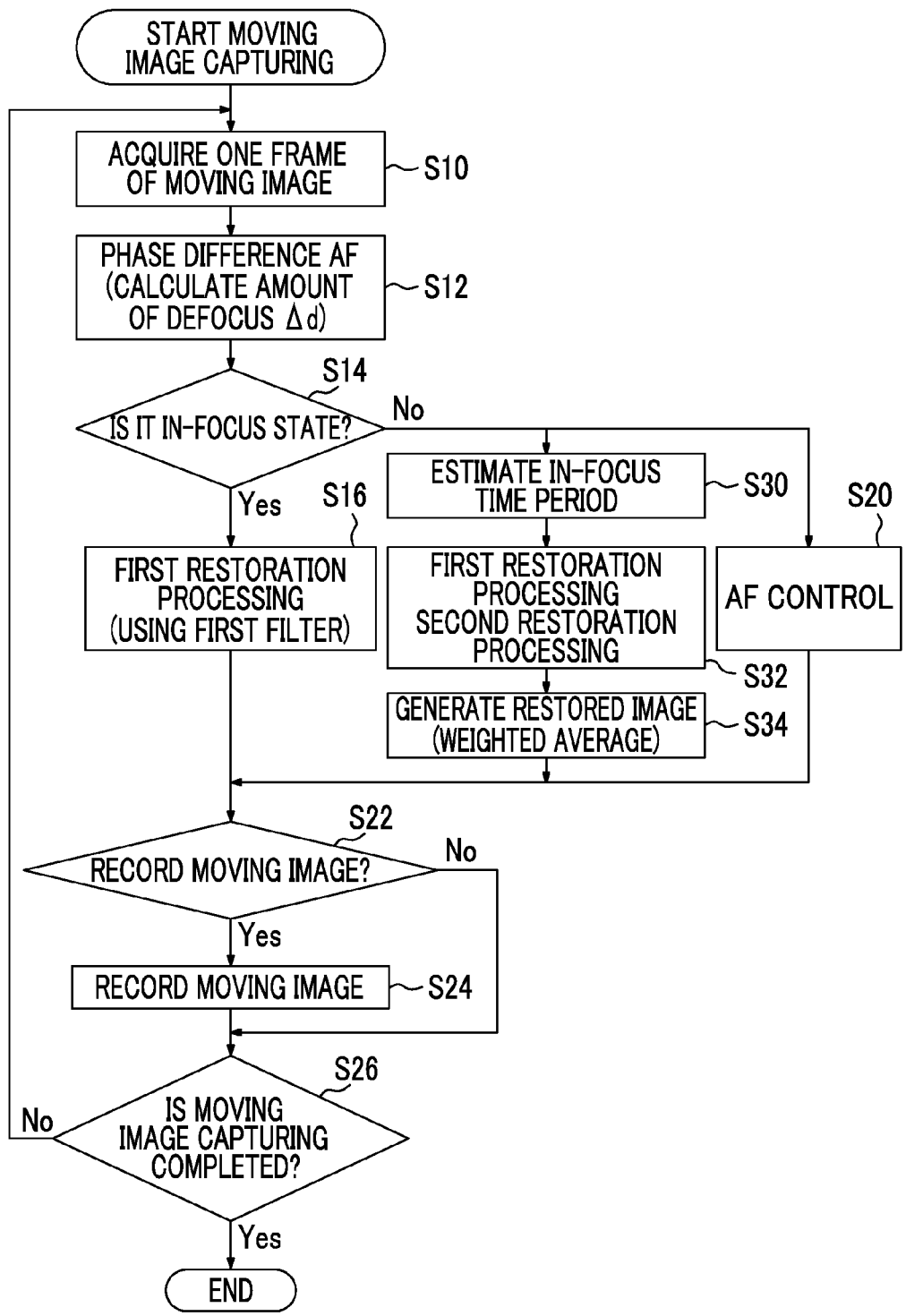
FIG. 13 is a flowchart illustrating an image processing method corresponding to the second embodiment.

FIG. 13 is a flowchart illustrating an image processing method corresponding to the second embodiment. In FIG. 13, the elements the same as those in the first embodiment shown in FIG. 10 will be represented by the same step numerals and signs, and a detailed description thereof will be omitted from discussion.

In FIG. 13, if it is determined that the image at the current time point is not in the in-focus state (the amount of defocus $\Delta d$ is out of the range of the depth of focus) (step S14), the focusing time estimation section 220 estimates the focusing time period on the basis of the amount of defocus $\Delta d$ (focusing time estimation step), and thereby acquires the weight coefficient corresponding to the estimated focusing time period (step S30).

Meanwhile, the first restoration processing section 110 and the second restoration processing section 120 respectively perform the restoration processing on the image at the current time point (luminance data Y) through the first filter 102 and the second filter 104, and calculate the luminance data $Y_A$ and $Y_B$ (step S32).

The weighted average calculation section 210 calculates the restored image (luminance data $Y_C$) through Numerical Expression 2 on the basis of the luminance data $Y_A$ and $Y_B$ calculated in step S32 and the weight coefficient acquired in step S30 (step S34).

<Modification Example of Second Embodiment>

Figure 14:
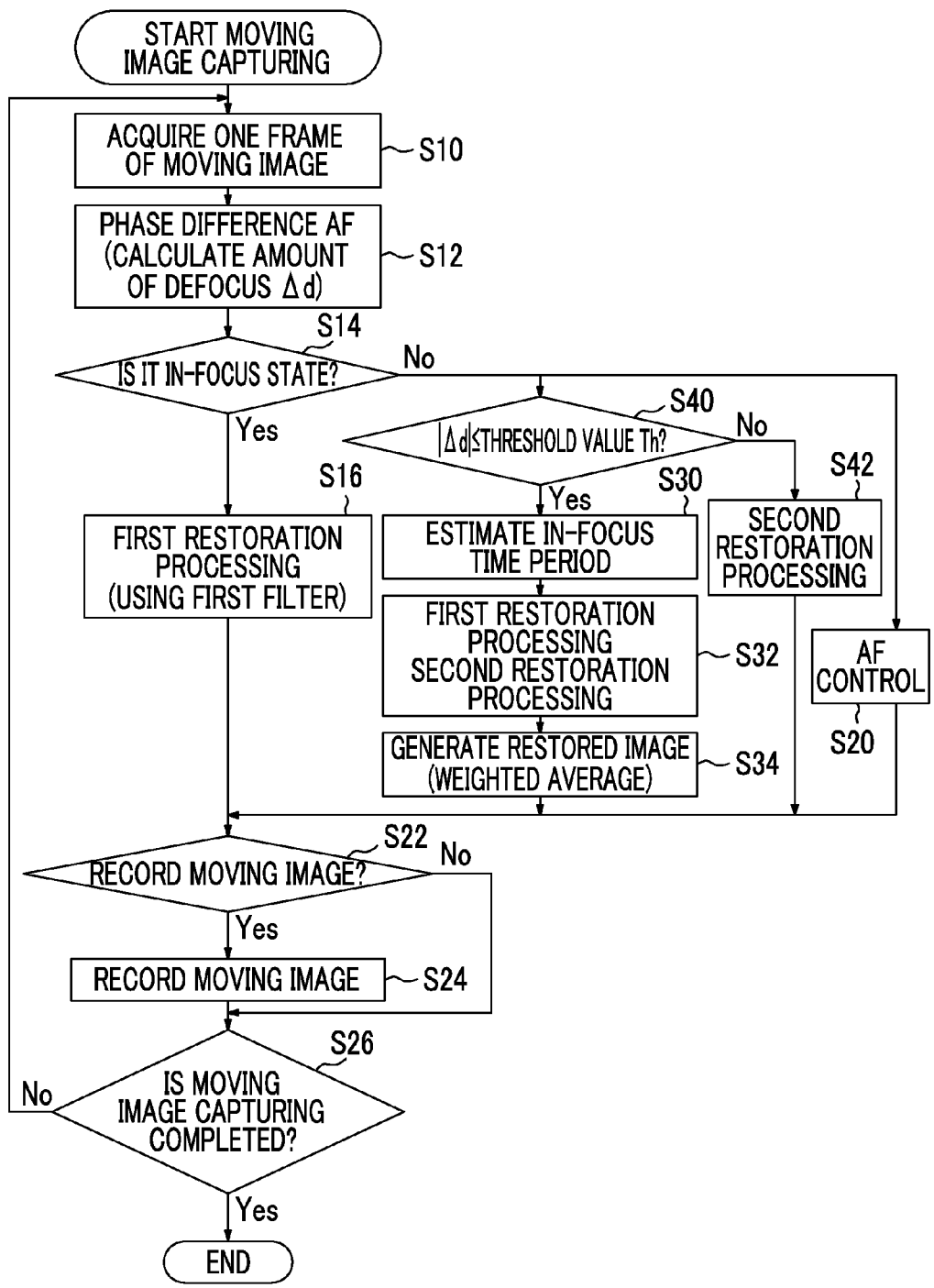
FIG. 14 is a flowchart illustrating an image processing method corresponding to a modified example of the second embodiment.

FIG. 14 is a flowchart illustrating an image processing method corresponding to a modified example of the second embodiment. In FIG. 14, the elements the same as those in the second embodiment shown in FIG. 13 will be represented by the same step numerals and signs, and a detailed description thereof will be omitted from discussion.

The modification example of the second embodiment shown in FIG. 14 is different from the flowchart shown in FIG. 13 in that steps S40 and S42 are added.

In FIG. 14, if it is determined that the image at the current time point is not in the in-focus state (the amount of defocus Δd is out of the range of the depth of focus) (step S14), the in-focus determination section 150 (FIG. 11) determines whether or not an absolute value |Δd| of the amount of defocus Δd calculated in step S12 is equal to or less than a threshold value Th (step S40). Here, for example, the threshold value Th can be set as the amount of defocus Δd in a state where the image is blurred to the extent that the amount of defocus Δd cannot be accurately calculated.

Subsequently, if the absolute value |Δd| of the amount of defocus Δd is equal to or less than the threshold value Th (if "Yes"), the process advances to step S30. In contrast, if the value is greater than the threshold value Th (if "No"), the process advances to step S42. In addition, in step S40, it is possible to advance the process to step S42 even when the amount of defocus Δd cannot be calculated in step S12.

In step S42, the image at the current time point (luminance data Y) is subjected to the restoration processing through the second filter 104, the luminance data $Y_B$ is calculated, and the luminance data $Y_B$ is output as a restored image (luminance data $Y_C$).

As described above, if a degree of image blurring is large, the luminance data $Y_B$, which is restored through the second filter 104, is output as it is, without using the luminance data $Y_A$ which is restored through the first filter 102. Thereby, overcorrection is prevented from being performed on an image in which a degree of blurring is large.

<Third Embodiment>

Next, a third embodiment of the restoration processing device within the image capture device 10 will be described.

Figure 15:
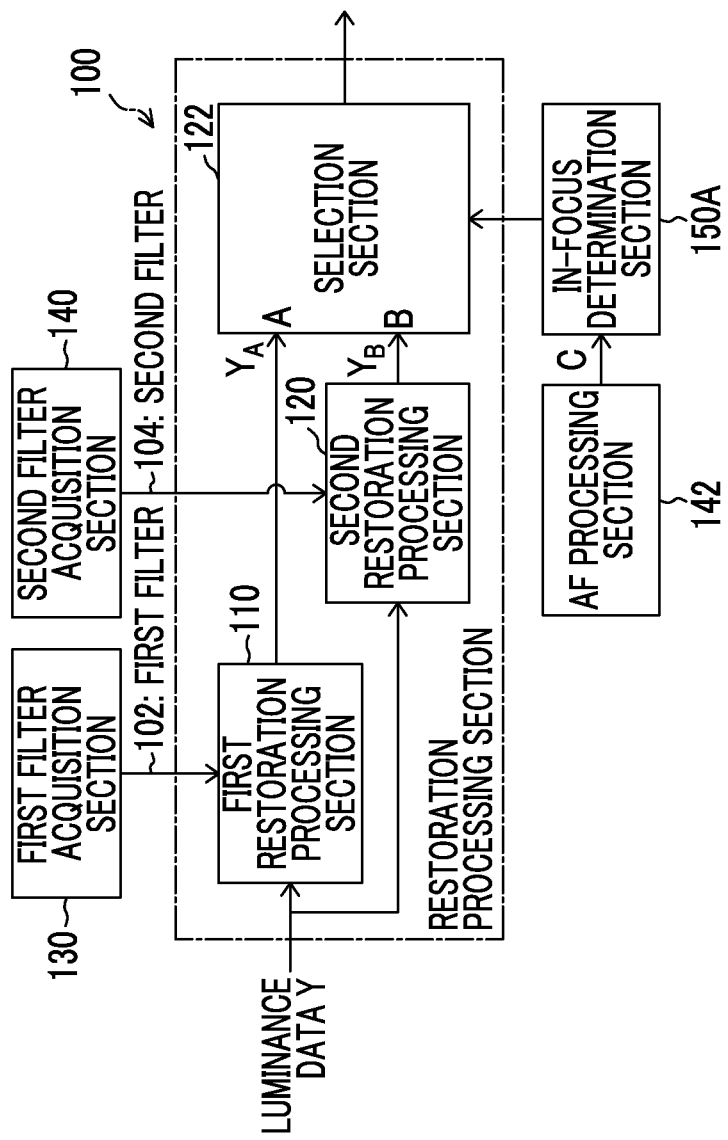
FIG. 15 is a main section block diagram illustrating a third embodiment of a restoration processing device.

FIG. 15 is a main section block diagram illustrating the third embodiment of the restoration processing device. In FIG. 15, the elements the same as those in the first embodiment shown in FIG. 9 will be represented by the same reference numerals and signs, and a detailed description thereof will be omitted from discussion.

The restoration processing device of the third embodiment shown in FIG. 15 is different from that of the first embodiment in an AF processing section 142 and an in-focus determination section 150A.

That is, there is a difference in that the AF processing section 42 of the first embodiment calculates the amount of defocus for phase difference AF but the AF processing section 142 of the third embodiment calculates an AF evaluation value for contrast AF.

The AF processing section 142 extracts high-frequency components from an image (for example, image data of G) of the AF region through a highpass filter (HPF), and calculates a sum value (AF evaluation value C) of the absolute values of the high-frequency components.

The CPU 40 moves the photography lens 12 to a lens position, at which the AF evaluation value C is a peak value (the contrast is the maximum), through the lens driving section 36, on the basis of the AF evaluation value which is calculated by the AF processing section 142.

The contrast AF of the moving image in the process of image capturing is performed as continuous AF in which the AF evaluation value C is constantly a peak value.

Figure 16:
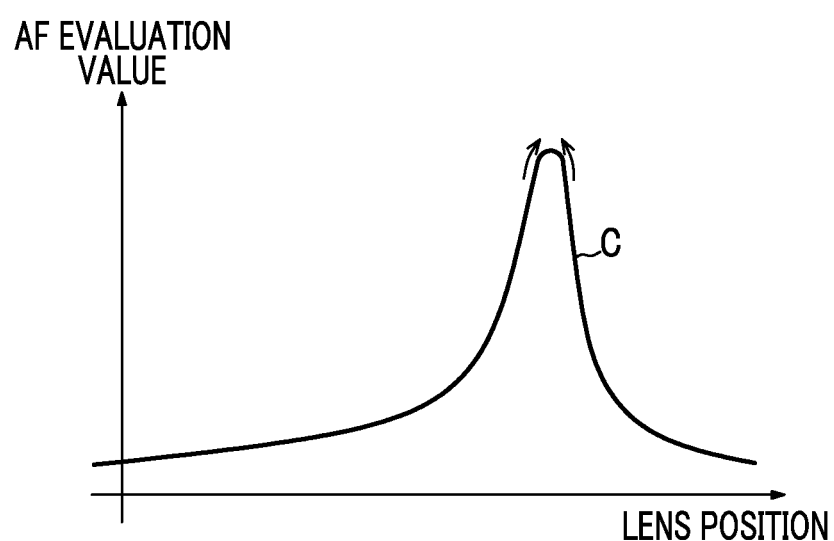
FIG. 16 is a graph illustrating an AF evaluation value used for explaining a contrast AF in the process of image capturing of a moving image.

As shown in FIG. 16, when the lens position of the photography lens 12 is moved, the AF evaluation value C changes. The contrast AF of the moving image in the process of image capturing performs so-called hill-climbing control to control the photography lens 12 (focus lens) such that the AF evaluation value C is kept constant at the peak position. In other words, AF evaluation values C of the images of the moving image are sequentially calculated, and the direction of the peak value of the AF evaluation values C is detected from the change in the calculated AF evaluation values C. Then, if the AF evaluation value C acquired while the focus lens is moved is greater than the peak value, it is determined that the lens position at the peak value is the in-focus position.

The in-focus determination section 150A of FIG. 15 inputs the AF evaluation value C from the AF processing section 142, and determines whether or not the currently captured image is in the target in-focus state, on the basis of whether or not the AF evaluation value C is the peak value. In addition, the in-focus determination section 150A may acquire information, which indicates whether or not the currently captured image is in the target in-focus state, from the CPU 40.

Then, the in-focus determination section 150A outputs a selection command signal for selecting the luminance data $Y_A$ of the input A to the selection section 122 if it is determined that the currently captured image is in the target in-focus state, and outputs a selection command signal for selecting the luminance data $Y_B$ of the input B to the selection section 122 if it is determined that the currently captured image is not in the target in-focus state.

As described above, according to the third embodiment, in a case of the image which is in the target in-focus state among the successively captured images in the moving image photography mode, the image (luminance data $Y_A$), which is restored through the first filter 102, is output. In a case of the image which is not in the in-focus state, the image (luminance data $Y_B$), which is restored through the second filter 104, can be output.

Figure 17:
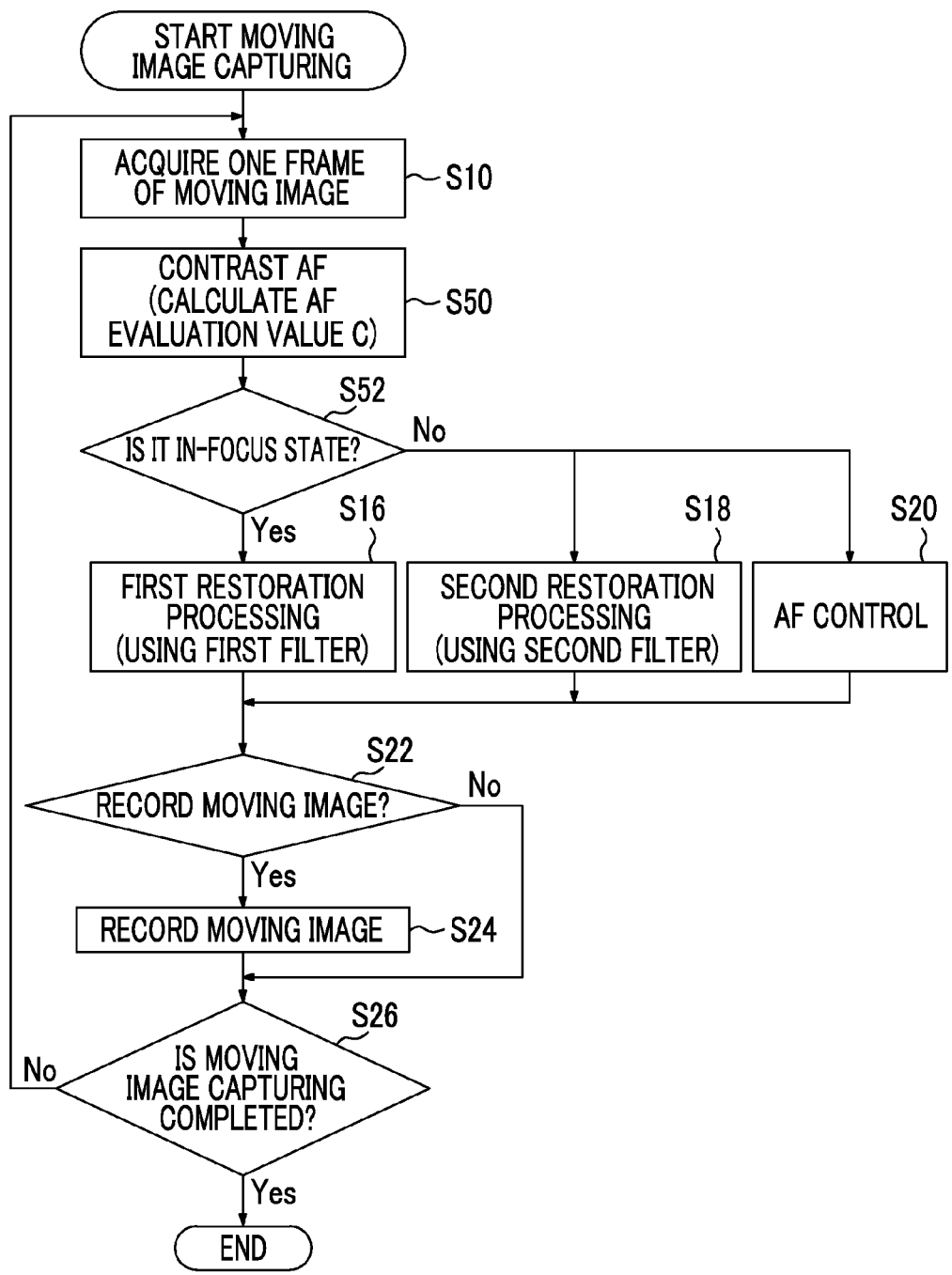
FIG. 17 is a flowchart illustrating an image processing method corresponding to the third embodiment.

FIG. 17 is a flowchart illustrating an image processing method corresponding to the third embodiment. In FIG. 17, the elements the same as those in the first embodiment shown in FIG. 10 will be represented by the same step numerals and signs, and a detailed description thereof will be omitted from discussion.

The image processing method corresponding to the third embodiment shown in FIG. 17 is different in that the processes of steps S50 and S52 are performed instead of steps S12 and S14 in the first embodiment shown in FIG. 10.

In step S50, the AF processing section 142 extracts high-frequency components from the image of the AF region in one frame (image corresponding to one frame) of the moving image acquired in step S10, and calculates the AF evaluation value C which is obtained by summing up the absolute values of the high-frequency components.

Subsequently, in step S52, the in-focus determination section 150A determines whether or not the currently captured image is in the target in-focus state, on the basis of determination as to whether or not the current AF evaluation value C is the peak value, on the basis of the AF evaluation values C sequentially calculated.

Then, if it is determined that the image as a restoration target at the current time point is in the target in-focus state, the process advances to step S16, and the image at the current time point is subjected to the restoration processing through the first filter 102. In contrast, if it is determined that the image is not in the target in-focus state, the process advances to step S18, and the image at the current time point is subjected to the restoration processing through the second filter 104.

<Fourth Embodiment>

Next, a fourth embodiment of the restoration processing device within the image capture device 10 will be described.

Figure 18:
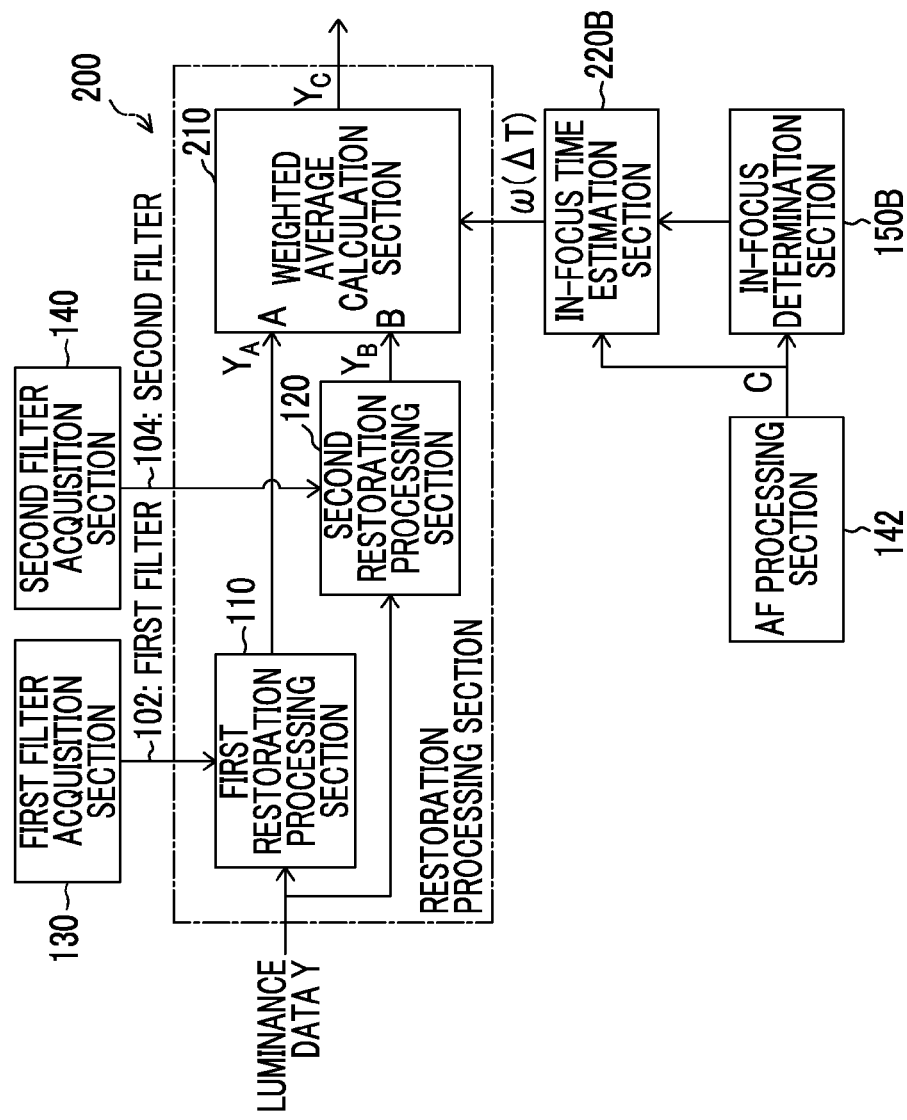
FIG. 18 is a main section block diagram illustrating a fourth embodiment of a restoration processing device.

FIG. 18 is a main section block diagram illustrating the fourth embodiment of the restoration processing device. In FIG. 18, the elements the same as those in the second embodiment shown in FIG. 11 will be represented by the same reference numerals and signs, and a detailed description thereof will be omitted from discussion.

The restoration processing device of the fourth embodiment shown in FIG. 18 is different in that it has an AF processing section 142, an in-focus determination section 150B, and a focusing time estimation section 220B, instead of the AF processing section 42, the in-focus determination section 150, and the focusing time estimation section 220 of the second embodiment.

In a manner similar to that of the third embodiment of FIG. 15, the AF processing section 142 extracts high-frequency components from the images of the AF regions of the images of the moving image, calculates the AF evaluation values C for the contrast AF, and outputs the calculated AF evaluation values C to each of the in-focus determination section 150B and the focusing time estimation section 220B.

The in-focus determination section 150B determines whether or not the AF evaluation value C is the peak value (whether or not the currently captured image is focused) on the basis of the AF evaluation values C which are input from the AF processing section 142, and outputs the determination result to the focusing time estimation section 220B.

The focusing time estimation section 220B is operable if the in-focus determination section 150B determines that the image at the current time point is not in the target in-focus state, and estimates a time period (focusing time period), which will elapse before the AF evaluation value C reaches a first threshold value Th1 set to correspond to the target in-focus state, on the basis of the AF evaluation values C which are sequentially input from the AF processing section 142.

Figure 19:
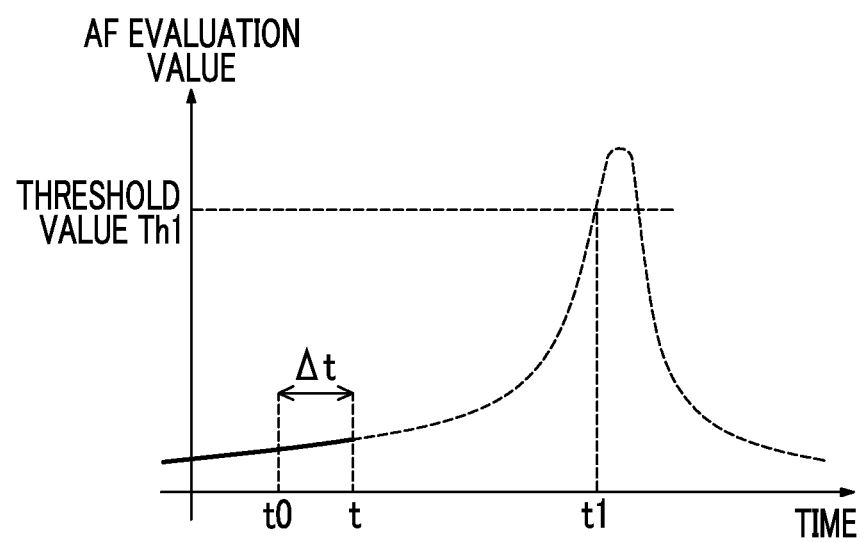
FIG. 19 is a diagram used for explaining estimation of a focusing time period at the time of the contrast AF.

For example, as shown in FIG. 19, assuming that a time at which the previous AF evaluation value C was calculated is t0 and a current time at which the current AF evaluation value C is calculated is t, the amount of change in the AF evaluation value C for the time interval $\Delta t$ between the times t0 and t is calculated. Then, a time period $\Delta T$ (=t1−t), which will elapse before the AF evaluation value C reaches the first threshold value Th1 of the AF evaluation value that is set to correspond to the target in-focus state, is estimated from the amount of change in the AF evaluation value C during the time interval $\Delta t$.

Here, as the first threshold value Th1, for example, it is possible to employ the AF evaluation value obtained when a general photographic subject is in focus. In addition, the AF evaluation value in the in-focus state changes depending on the magnitude of contrast of the photographic subject, the photography conditions, and the like. Accordingly, it is preferable that the first threshold value Th1 is set in accordance with the current photography scene (a portrait mode, a landscape mode, or the like selected by scene selection means) and the photography conditions (the photographic subject luminance, the zoom ratio, and the like).

The focusing time estimation section 220B estimates the focusing time period $\Delta T$, which will elapse before the AF evaluation value C reaches the first threshold value Th1 that is set to correspond to the target in-focus state, on the basis of the amount of change in the AF evaluation value C during the time interval $\Delta t$, and outputs a weight coefficient $\omega(\Delta T)$ corresponding to the estimated focusing time period $\Delta T$ to the weighted average calculation section 210.

The weighted average calculation section 210 calculates a weighted average value (luminance data $Y_C$) through the above-mentioned Numerical Expression 2, on the basis of the luminance data $Y_A$ calculated by the first restoration processing section 110, the luminance data $Y_B$ calculated by the second restoration processing section 120, and the weight coefficient $\omega(\Delta T)$ which is input from the focusing time estimation section 220B, and outputs the calculated luminance data $Y_C$.

Thereby, the image, which is in the target in-focus state, is subjected to the restoration processing through the first filter. Accordingly, a degraded image corresponding to the PSF of the photography lens 12 can be restored to a high-resolution image. Meanwhile, by changing a time period from the blurred state to the in-focus state and a weight at the time of weighted averaging, smoothly connected restored images can be generated.

If the AF evaluation value C reaches the peak value before it reaches the first threshold value Th1, priority is given to the determination result of the in-focus determination section 150B, and the luminance data $Y_A$ calculated by the first restoration processing section 110 is output as the luminance data $Y_C$. Further, if the AF evaluation value C is greater than the first threshold value Th1, the luminance data $Y_A$ is also output as the luminance data $Y_C$.

Figure 20:
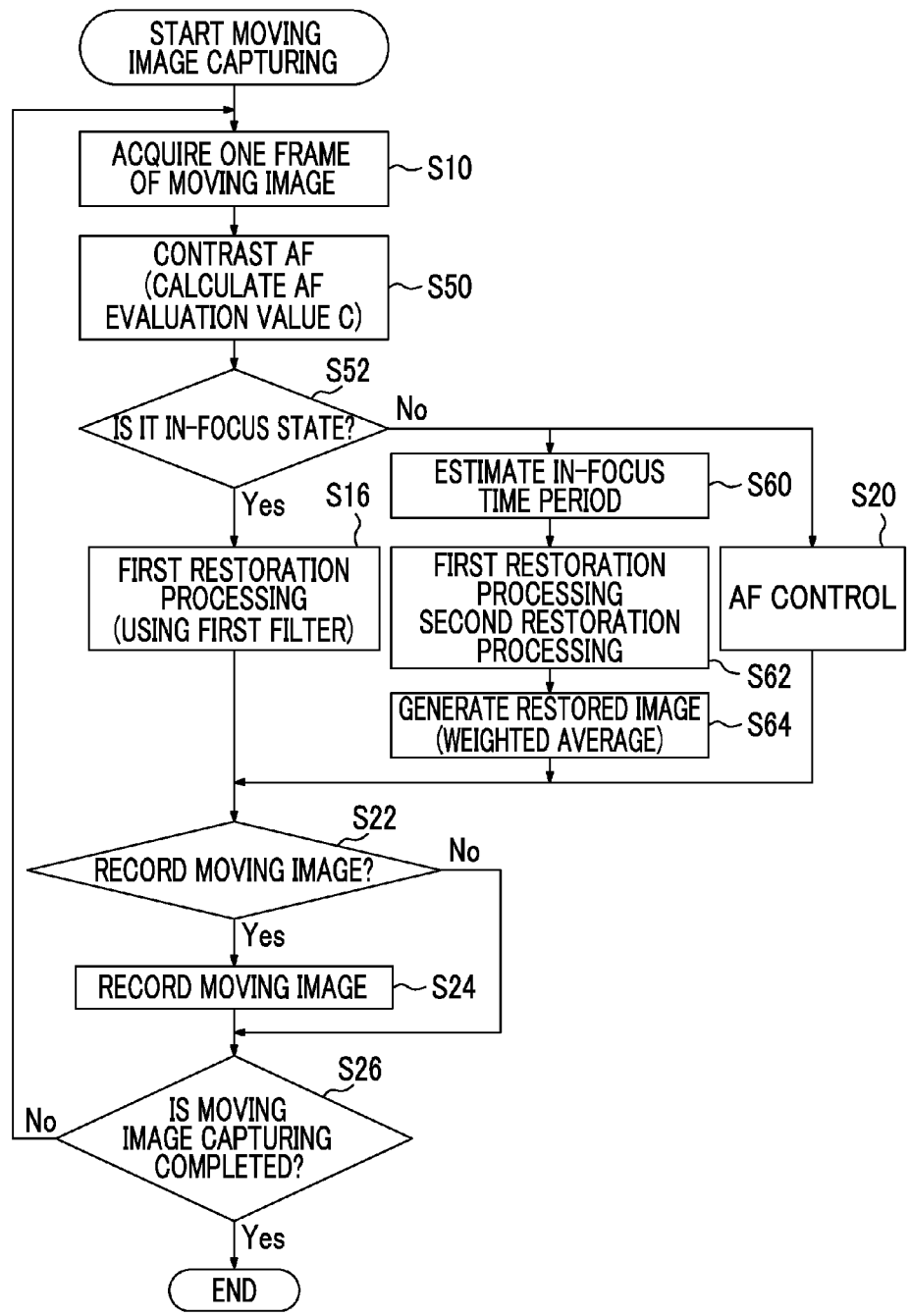
FIG. 20 is a flowchart illustrating an image processing method corresponding to the fourth embodiment.

FIG. 20 is a flowchart illustrating an image processing method corresponding to the fourth embodiment. In FIG. 20, the elements the same as those in the third embodiment shown in FIG. 17 will be represented by the same step numerals and signs, and a detailed description thereof will be omitted from discussion.

The image processing method corresponding to the fourth embodiment shown in FIG. 20 is different in that the processes of steps S60, S62, and S64 are performed instead of step S18 shown in FIG. 17.

In step S52, if it is determined that the image at the current time point is not in the in-focus state (the AF evaluation value C is not the peak value), the focusing time estimation section 220B estimates the focusing time period on the basis of the amount of change in the AF evaluation value C and first threshold value Th1, and acquires a weight coefficient corresponding to the estimated focusing time period (step S60).

Meanwhile, the first restoration processing section 110 and the second restoration processing section 120 respectively perform the restoration processing on the image at the current time point (luminance data Y) through the first filter 102 and the second filter 104, and calculate the luminance data $Y_A$ and $Y_B$ (step S62).

The weighted average calculation section 210 calculates the restored image (luminance data $Y_C$) through Numerical Expression 2 on the basis of the luminance data $Y_A$ and $Y_B$ calculated in step S62 and the weight coefficient acquired in step S60 (step S64).

Figure 21:
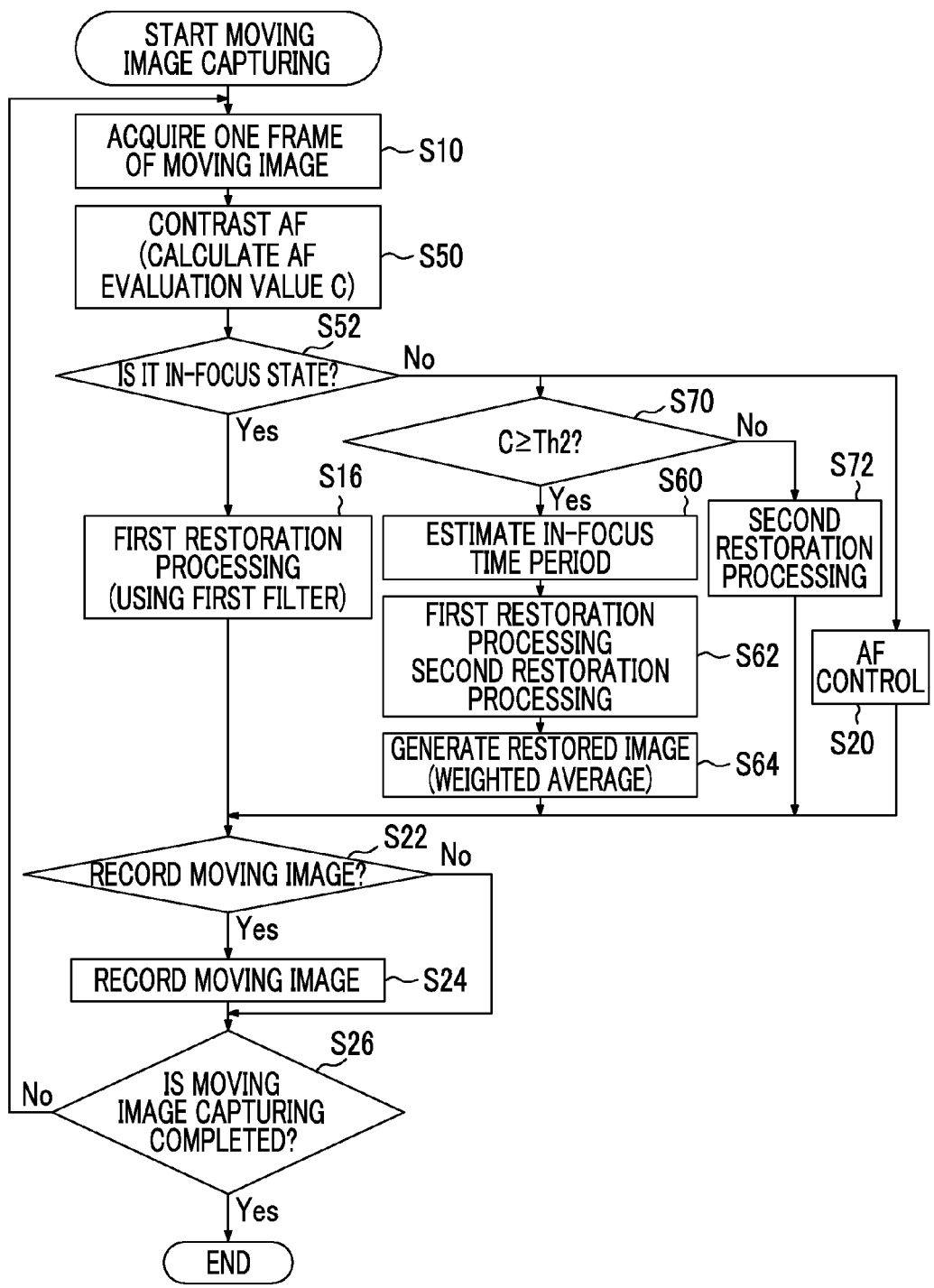
FIG. 21 is a flowchart illustrating an image processing method corresponding to a modified example of the fourth embodiment.

FIG. 21 is a flowchart illustrating an image processing method corresponding to a modified example of the fourth embodiment. In FIG. 21, the elements the same as those in the fourth embodiment shown in FIG. 20 will be represented by the same step numerals and signs, and a detailed description thereof will be omitted from discussion.

The modification example of the fourth embodiment shown in FIG. 21 is different from the flowchart shown in FIG. 20 in that steps S70 and S72 are added.

Figure 22:
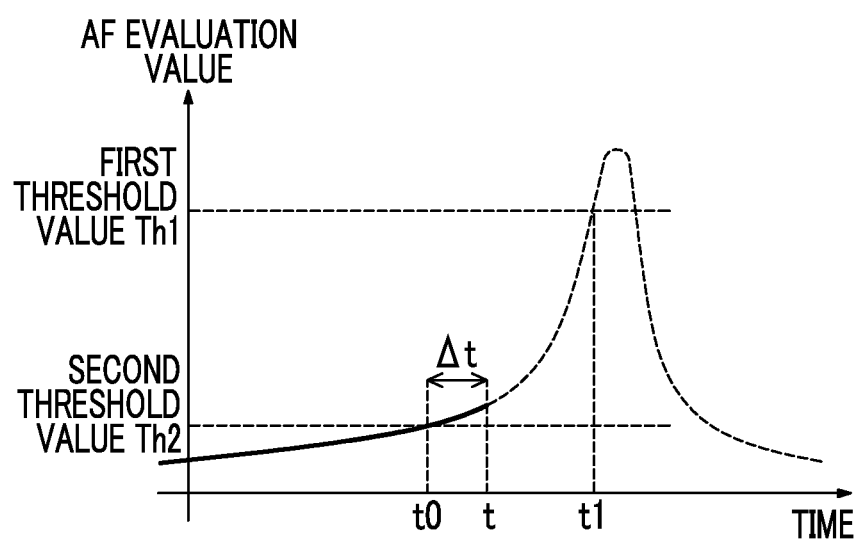
FIG. 22 is a diagram used for explaining a threshold value of the AF evaluation value.

In FIG. 21, if it is determined that the image at the current time point is not in the in-focus state (the AF evaluation value C is not the peak value) (step S52), the in-focus determination section 150B (FIG. 18) determines whether or not the AF evaluation value C calculated in step S50 is equal to or greater than a second threshold value Th2 (step S70). Here, as shown in FIG. 22, the second threshold value Th2 is, for example, a sufficiently low value of the AF evaluation value C, for example, an AF evaluation value C in a state where a degree of blurring of the image is large.

Then, if the AF evaluation value C is equal to or greater than the second threshold value Th2 (if "Yes"), the process advances to step S60. In contrast, if the AF evaluation value C is less than the second threshold value Th2 (if "No"), the process advances to step S72.

In step S72, the image at the current time point (luminance data Y) is subjected to the restoration processing through the second filter 104, the luminance data $Y_B$ is calculated, and the luminance data $Y_B$ is output as a restored image (luminance data $Y_C$).

As described above, if a degree of image blurring is large, the luminance data $Y_B$, which is restored through the second filter 104, is output as it is, without using the luminance data $Y_A$ which is restored through the first filter 102. Thereby, overcorrection is prevented from being performed on an image in which a degree of blurring is large.

<Fifth Embodiment>

Next, a fifth embodiment of the restoration processing device within the image capture device 10 will be described.

Figure 23:
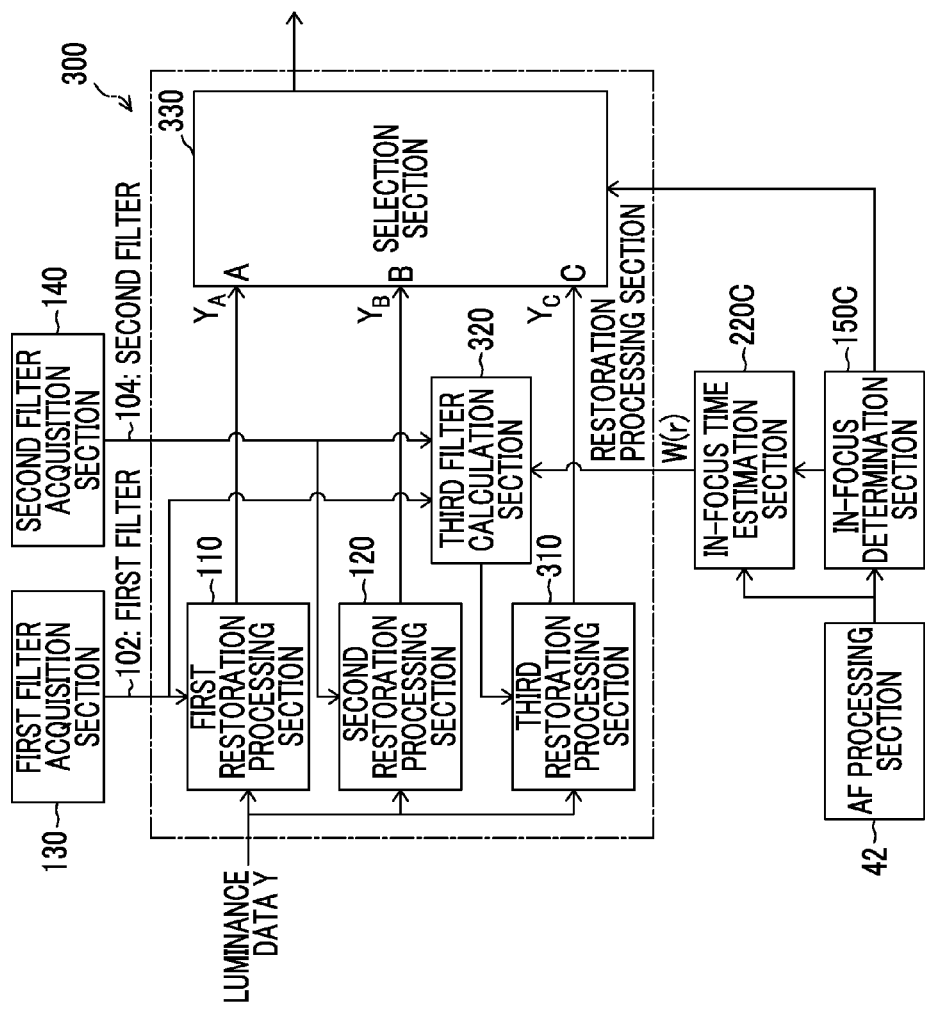
FIG. 23 is a main section block diagram illustrating a fifth embodiment of a restoration processing device.

FIG. 23 is a main section block diagram illustrating the fifth embodiment of the restoration processing device. In FIG. 23, the elements the same as those in the second embodiment shown in FIG. 11 will be represented by the same reference numerals and signs, and a detailed description thereof will be omitted from discussion.

The restoration processing device of the fifth embodiment shown in FIG. 23 mainly includes: a restoration processing section 300 which is a modification example of the restoration processing section 100 mainly shown in FIG. 7; the first filter acquisition section 130; the second filter acquisition section 140; an in-focus determination section 150C; and a focusing time estimation section 220C.

The restoration processing section 300 further includes the first restoration processing section 110, the second restoration processing section 120, a third restoration processing section 310, a third filter calculation section 320, and a selection section 330.

The fifth embodiment is different from the second embodiment in that a new third filter is calculated mainly using the first filter 102 and the second filter 104 and third restoration processing is performed using the calculated third filter.

In FIG. 23, the focusing time estimation section 220C is operable if the in-focus determination section 150C determines that the image at the current time point is not in the target in-focus state, and estimates the focusing time, at which the amount of defocus enters the range of the depth of focus, on the basis of the amount of defocus which is input from the AF processing section 42. Then, on the basis of the focusing time estimated as the current time, the weight coefficient is calculated.

Here, assuming that the previous time at which the third filter was calculated is t0, the current time is t (t>t0), and the estimated focusing time is t1, a variable r (0≤r≤1) represented by the following expression is calculated.

$r=(t-t0)/(t1-t0)$  [Numerical Expression 3]

Figure 24:
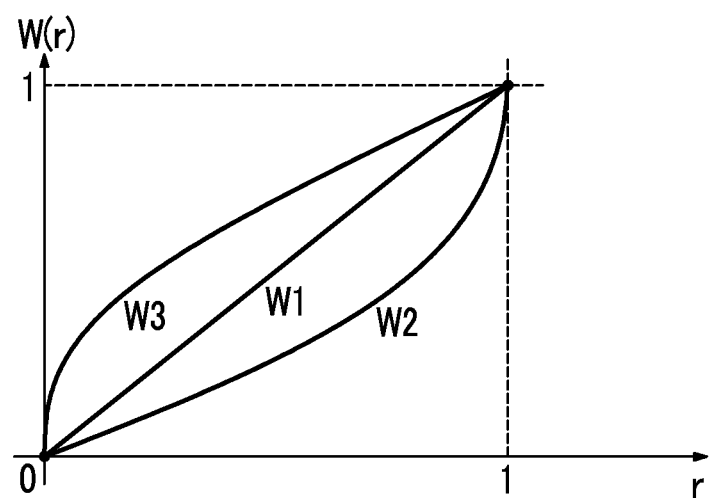
FIG. 24 is a graph illustrating an arbitrary monotonically increasing function.

Then, a weight coefficient W(r) is calculated through an arbitrary monotonically increasing function (for example, W1, W2, or W3 shown in FIG. 24) and the variable r. As shown in FIG. 24, the weight coefficient W(r) satisfies W(0)=0 and W(1)=1.

The focusing time estimation section 220C calculates the weight coefficient W(r) on the basis of the estimated focusing time t1 or the like as described above, and outputs the weight coefficient W(r) to the third filter calculation section 320.

The first filter 102 and the second filter 104 are respectively added to the third filter calculation section 320 from the first filter acquisition section 130 and the second filter acquisition section 140. The third filter calculation section 320 calculates a third filter X(t) through the following expression on the basis of the first filter 102, the second filter 104, and the weight coefficient W(r).

$X(t)=(1-W(r))\times X(t0)+W(r)\times F$  [Numerical Expression 4]

In Numerical Expression 4, assuming that the X(t0) is a third filter at the previous time t0 and the second filter 104 acquired from the second filter acquisition section 140 is A, a third filter X(0) at the first time is A (X(0)=A). Further, F is the first filter which is acquired by the first filter acquisition section 130 and corresponds to the photography conditions of the optical system at the estimated focusing time t1.

As can be clearly seen from the above-mentioned Numerical Expression 3 and Numerical Expression 4, the variable r and the weight coefficient W(r) gradually become close to 1 in accordance with the elapse of the time period for the AF control. As a result, the third filter X(t) becomes gradually closer to the first filter 102 from the second filter 104.

The third restoration processing section 310 is a section that performs the restoration processing on the luminance data Y added from the RGB/YC conversion section 62, and the third filter X(t), which is calculated by the third filter calculation section 320 as described above, is added to other inputs. Then, the third restoration processing section 310 performs convolution on luminance data having a kernel size of 7×7 including the luminance data Y of the restoration processing target and the third filter X(t) which is input from the third filter calculation section 320, and outputs the luminance data $Y_C$ as a result of the convolution to an input C of the selection section 330.

The selection section 330 selects and outputs any one of the luminance data $Y_A$, $Y_B$, and $Y_C$ added to the inputs A, B, and C, on the basis of a selection command signal which is output from the in-focus determination section 150C.

The in-focus determination section 150C inputs the amount of defocus Δd from the AF processing section 42, and determines whether or not the amount of defocus Δd is in the range of the depth of focus and whether or not the absolute value of the amount of defocus Δd is greater than the threshold value Th. Then, the in-focus determination section 150C outputs a selection command signal for selecting the luminance data $Y_A$ of the input A to the selection section 330 if it is determined that the currently captured image is in the target in-focus state, outputs a selection command signal for selecting the luminance data $Y_B$ of the input B to the selection section 330 if it is determined that the absolute value of the amount of defocus Δd is greater than the threshold value Th, and otherwise outputs a selection command signal for selecting the luminance data $Y_C$ of the input C to the selection section 330.

That is, in the fifth embodiment of the restoration processing device, in a case of the image which is in the target in-focus state among the successively captured images in the moving image photography mode, the image (luminance data $Y_A$), which is restored through the first filter 102, is output. In a case of the image in which a degree of blurring is large, the image (luminance data $Y_B$), which is restored through the second filter 104, is output. Otherwise, the image (luminance data $Y_C$), which is restored through the third filter generated from the second filter 104 and the first filter 102, is output.

Thereby, the image, which is in the target in-focus state, is subjected to the restoration processing through the first filter. Accordingly, a degraded image corresponding to the PSF of the photography lens 12 can be restored to a high-resolution image. In contrast, the image, in which a degree of blurring is large, is subjected to the restoration processing through the second filter of which the restoration strength is weak. Accordingly, image quality is not lowered through overcorrection and the like. Further, in accordance with the in-focus state, it is possible to perform the restoration processing of smoothly connecting high-resolution images.

The third filter calculation section 320 is not limited to the case of calculating the third filter for each image, and may calculate the third filter whenever a plurality of images is acquired. In this case, until the third filter calculation section 320 calculates the next third filter, the third restoration processing section 310 uses the previously calculated third filter in the restoration processing of the plurality of images.

The weight coefficient W(r) represented by Numerical Expression 4 is set as a function of the variable r corresponding to the focusing time t1 estimated through Numerical Expression 3. However, the weight coefficient W(r) is not limited to this, and may be set as a function corresponding to the detected amount of defocus Δd. Consequently, when the detected amount of defocus Δd is set to be smaller, the weight coefficient W(r) is set to be larger.

Figure 25:
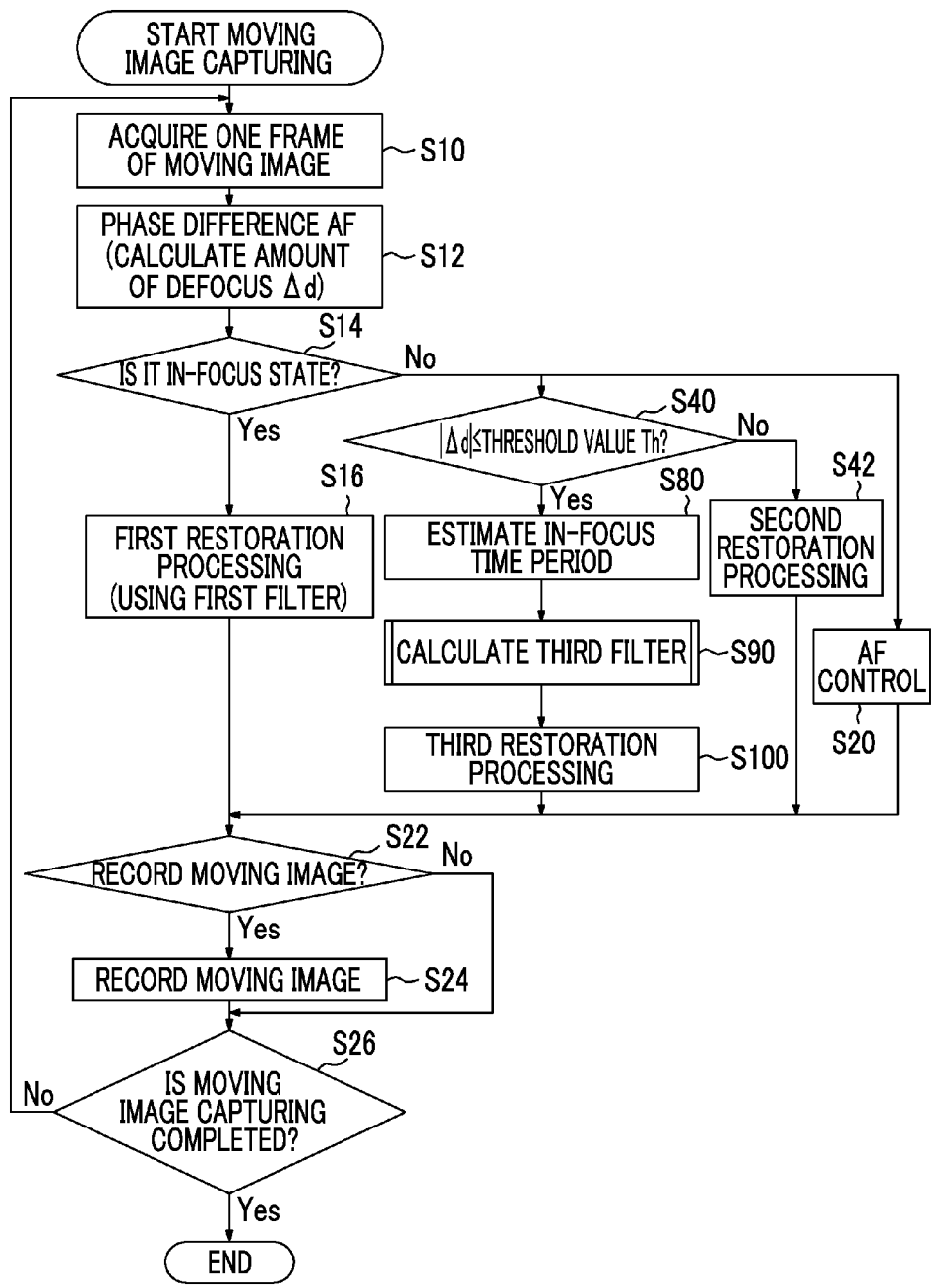
FIG. 25 is a flowchart illustrating an image processing method corresponding to the fifth embodiment.

FIG. 25 is a flowchart illustrating an image processing method corresponding to the fifth embodiment. In FIG. 25, the elements the same as those in the modification example of the second embodiment shown in FIG. 14 will be represented by the same step numerals and signs, and a detailed description thereof will be omitted from discussion.

In FIG. 25, if the in-focus determination section 150C (FIG. 23) determines that the in-focus state of the current image is not the target in-focus state and the absolute value |Δd| of the amount of defocus Δd is equal to or less than the threshold value Th, on the basis of the amount of defocus Δd calculated in step S12 (step S14, S40), the process advances to step S80.

In step S80, the focusing time estimation section 220C estimates the focusing time t1. Subsequently, the third filter calculation section 320 calculates the third filter (step S90).

Figure 26:
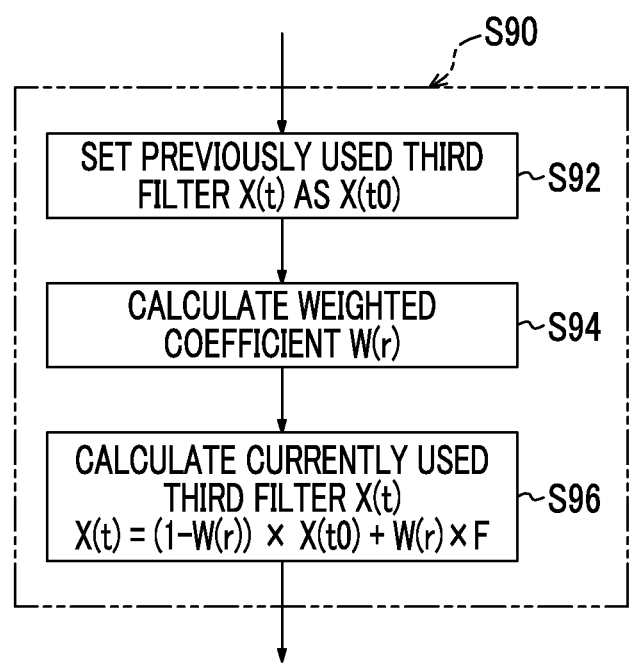
FIG. 26 is a flowchart illustrating details of step S90 of FIG. 25.

FIG. 26 illustrates processing contents in step S90.

First, the previously used third filter X(t) at the previous time t0 is set as X(t0) (step S92). In addition, the initially used third filter X(0) is the second filter 104.

Next, the weight coefficient W(r) is calculated on the basis of the estimated focusing time t1, the current time t, and the like in step S90 (step S94). The weight coefficient W(r) is, as shown in FIG. 24, a weight coefficient in the range of $0 \leq W(r) \leq 1$, and is a weight coefficient which becomes closer to 1 when the current time t becomes closer to the estimated focusing time t1.

Next, the currently used third filter X(t) is calculated through the above-mentioned Numerical Expression 4 on the basis of the third filter X(t0) which is set in step S92, the weight coefficient W(r) calculated in step S94, and the first filter F (step S96). In addition, it is preferable that, as the used first filter F, the first filter corresponding to the photography conditions of the estimated focusing time t1 is used.

When calculation of the third filter X(t) is completed, the third restoration processing section 310 performs the restoration processing on the image at the current time point (luminance data Y), on the basis of the third filter X(t), and outputs the image (luminance data $Y_C$) subjected to the restoration processing (FIG. 25, step S100).

<Sixth Embodiment>

Next, a sixth embodiment of the restoration processing device within the image capture device 10 will be described.

Figure 27:
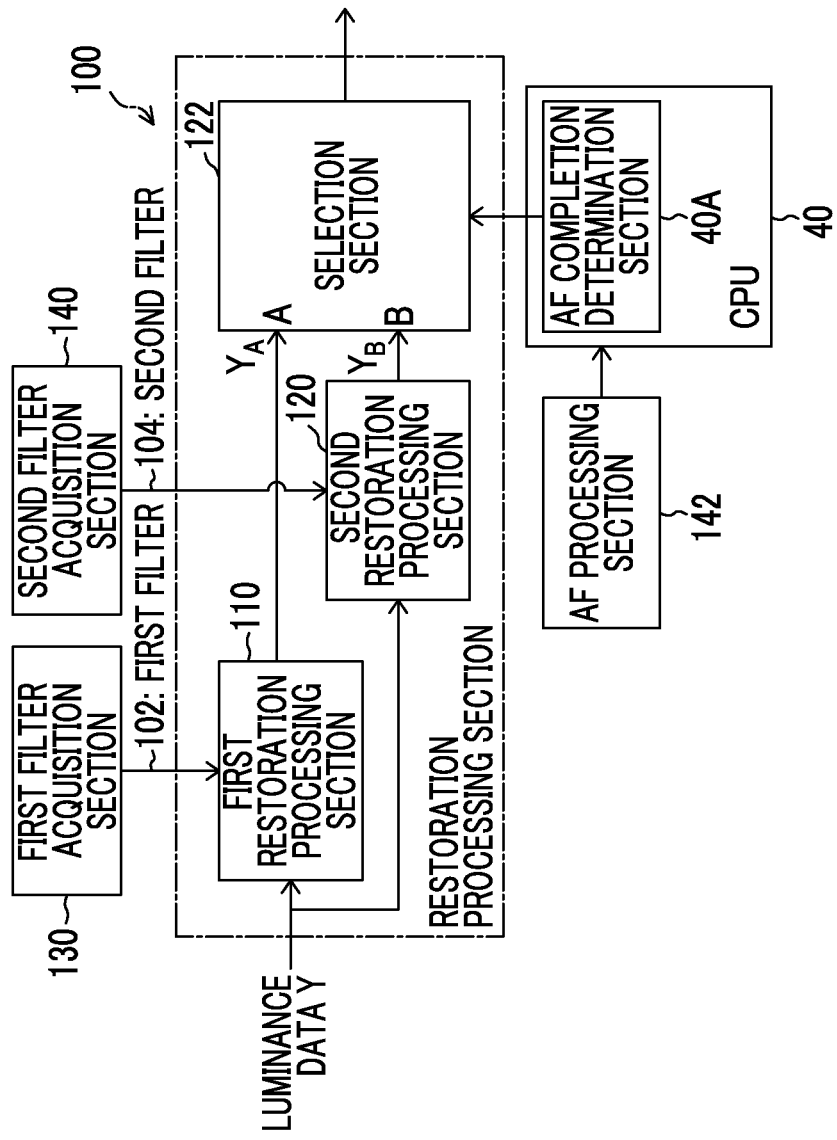
FIG. 27 is a main section block diagram illustrating a sixth embodiment of a restoration processing device.

FIG. 27 is a main section block diagram illustrating the sixth embodiment of the restoration processing device. In FIG. 27, the elements the same as those in the third embodiment shown in FIG. 15 will be represented by the same reference numerals and signs, and a detailed description thereof will be omitted from discussion.

The restoration processing device of the sixth embodiment shown in FIG. 27 is different from that of the third embodiment in that it performs processing in the course of displaying a live view image in the still image photography mode.

At the time of capturing the live view image in the still image photography mode, normally, the AF operation is stopped. In addition, there is also a camera that performs the continuous AF even in the course of image capturing of the live view image, but in the sixth embodiment, the AF operation is stopped at the time of capturing the live view image.

At the time of capturing the live view image in the still image photography mode, the CPU 40 starts the contrast AF when the shutter button 2 (photography preparation instruction section) is "pressed halfway" (S1 ON).

Next, the contrast AF in the still image photography mode will be described with reference to FIG. 28.

Figure 28:
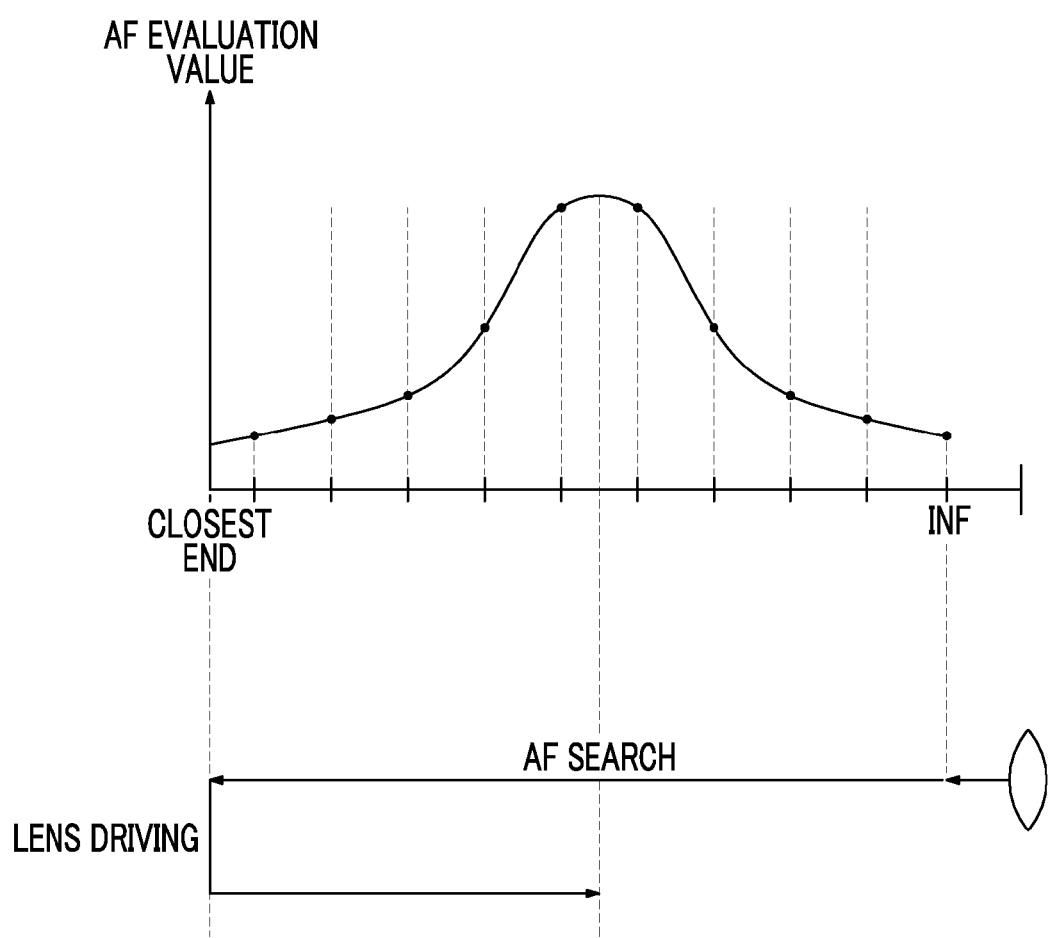
FIG. 28 is a diagram used for explaining the contrast AF at the time of capturing a still image.

As shown in FIG. 28, the CPU 40 outputs a lens movement command to move (perform AF search) the focus lens from the infinity side (INF) to the closest end when the shutter button 2 is "pressed halfway".

The CPU 40 acquires the AF evaluation value, which is calculated for each predetermined image in the course of the AF search, from the AF processing section 142, and calculates the lens position (in-focus position) at which the AF evaluation value is a peak value, on the basis of each AF evaluation value and each lens position. Then, the CPU 40 outputs the lens position command to move the focus lens to the calculated in-focus position, and moves the focus lens to the in-focus position.

As described above, when the AF control is completed, the focus lens is stopped at the in-focus position as long as the shutter button 2 is "pressed halfway".

An AF termination determination section 40A within the CPU 40 determines whether or not the AF control is completed as described above and the focus lens is held at the in-focus position, and outputs the determination result to the selection section 122. That is, the AF termination determination section 40A outputs the selection command signal to select the luminance data $Y_B$ of the input B to the selection section 122 if the control is not completed, and, outputs the selection command signal to select the luminance data $Y_A$ of the input A to the selection section 122 if the AF control is completed and the focus lens is held at the in-focus position.

The selection section 122 selects and outputs either one of the luminance data $Y_A$ and $Y_B$ added to the inputs A and B, on the basis of a selection command signal which is output from the AF termination determination section 40A.

That is, in the sixth embodiment of the restoration processing device, among the successively captured images in the still image photography mode, the luminance data $Y_B$ is output if the shutter button 2 is not operated, and the luminance data $Y_A$ is output if the shutter button 2 is "pressed halfway" and thereby the AF control is completed.

Thereby, the image, on which the AF control has been completed, is subjected to the restoration processing through the first filter. Accordingly, a degraded image corresponding to the PSF of the photography lens 12 can be restored to a high-resolution image. In contrast, the image, on which the AF control is not performed, or the image, on which the AF control has not been completed, is subjected to the restoration processing through the second filter of which the restoration strength is weak. Accordingly, image quality is not lowered through overcorrection and the like.

Figure 29:
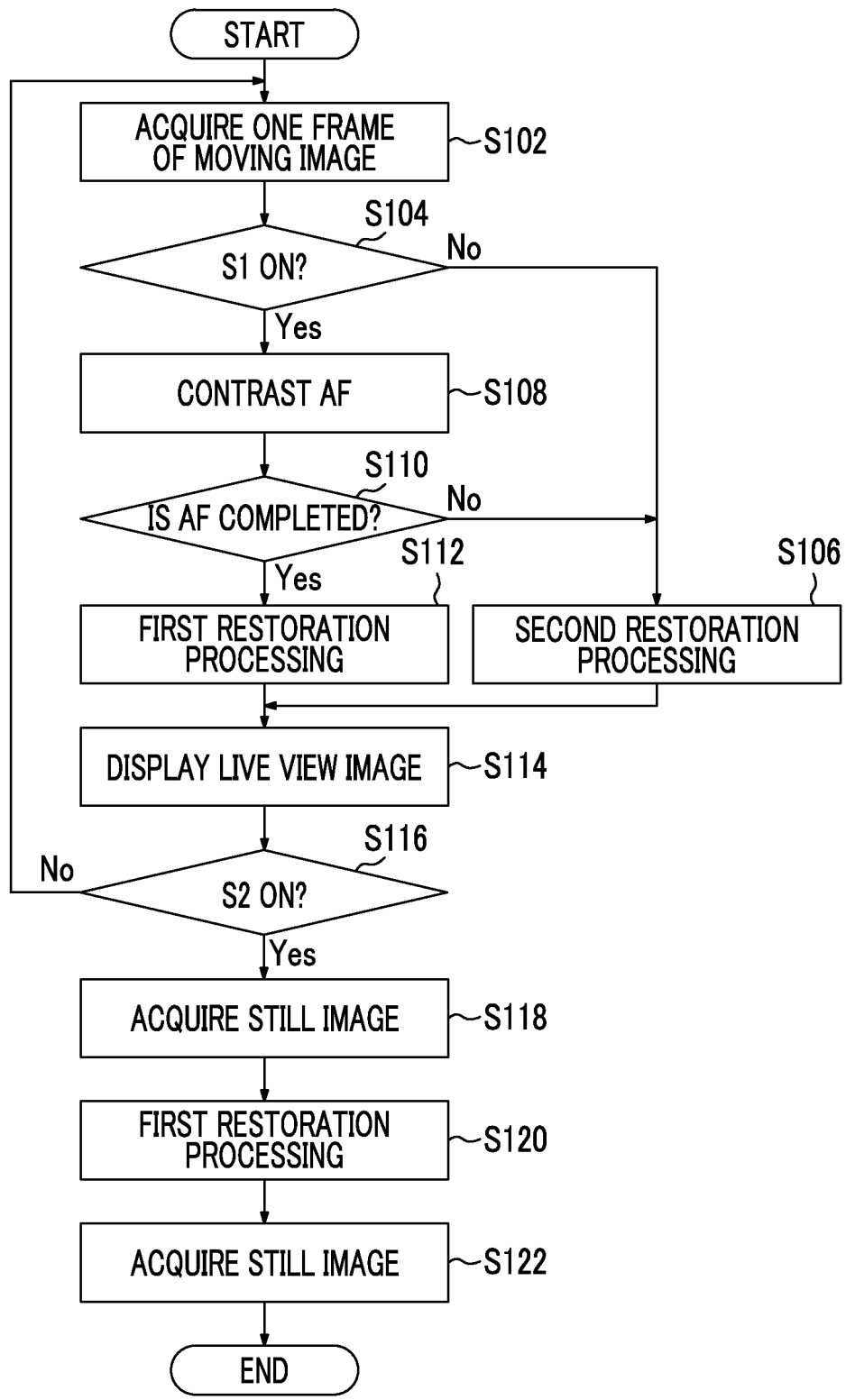
FIG. 29 is a flowchart illustrating an image processing method corresponding to the sixth embodiment.

FIG. 29 is a flowchart illustrating an image processing method corresponding to the sixth embodiment.

As shown in FIG. 29, in the still image photography mode, the CPU 40 drives the photography lens 12, the diaphragm 14, and the image capture element 16 (image capture section) such that a live view image (moving image) is captured, and acquires one frame (image corresponding to one frame) of the moving image (step S102).

Subsequently, the CPU 40 determines whether or not the shutter button 2 is "pressed halfway" (S1 ON) (step S104), and advances the process to step S106 if the shutter button 2 is not "pressed halfway". In step S106, the second restoration processing section 120 performs the restoration processing using the second filter 104. Here, the restored image is output to the liquid crystal monitor 30, and is displayed as a live view image (step S114).

In contrast, if the shutter button 2 is "pressed halfway", the process advances to step S108, and the contrast AF is performed. Subsequently, the AF termination determination section 40A determines whether or not the contrast AF is completed, advances the process to step S106 if the contrast AF is not completed, and advances the process to step S112 if the contrast AF is completed.

In step S112, the first restoration processing section 110 performs the restoration processing using the first filter 102. The restored image is output to the liquid crystal monitor 30, and is displayed as a live view image (step S114).

As described above, in the course of displaying the live view image, it is determined whether or not the shutter button 2 is "pressed fully" (S2 ON) (step S116). If the shutter button 2 is not "pressed fully", the process advances to step S102, and the processes of steps S102 to S116 are repeated. In contrast, if the shutter button 2 is "pressed fully", the still image is acquired (step S118), and the first restoration processing section 110 performs the restoration processing on the acquired still image through the first filter 102 (step S120).

The still image, which is restored to a high-resolution image, undergoes compression processing and the like, and is thereafter recorded in the memory card 54 (step S122), and the image capturing of the still image is terminated.

The image capture device 10 of the embodiment is a digital camera that has a moving image capture function and a still image capture function, but the present invention may be applied to a digital video camera. Further, embodiments, to which the present invention can be applied, are not limited to a digital camera and a digital video camera. The present invention also can be applied to not only cameras that mainly have an image capture function but also mobile equipment that has not only the image capture function but also functions (a phone call function, a communication function, and other computer functions) other than the image capture function. Examples of the embodiments, to which the present invention can be applied, include a mobile phone having a camera function, a smartphone, a personal digital assistant (PDA), and a portable game machine. Hereinafter, an example of a smartphone, to which the present invention is applicable, will be described.

For example, in some image capture devices such as a portable image capture device like a smartphone to be described later, the photography preparation instruction section and the image recording instruction section are not limited to the stroke-type switch which operates in a manner of having two steps which are "pressing halfway" and "pressing fully" like the shutter button 2. Each instruction section may be a section that has a function of receiving the photography preparation instruction or a function of receiving the image recording instruction. In addition, the instruction section may have other buttons, may have another section for receiving touch input operations, and may be configured to receive a photography preparation instruction or an image recording instruction through a sound input, a gaze input, or the like.

<Configuration of Smartphone>

Figure 30:
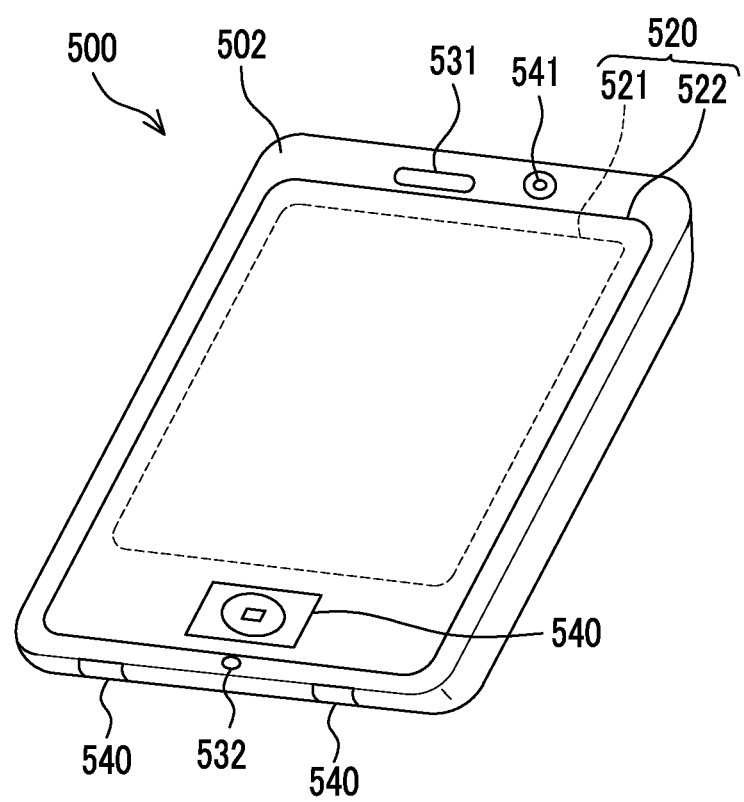
FIG. 30 is a perspective view illustrating an appearance of a smartphone.

FIG. 30 is a perspective view illustrating an appearance of a smartphone 500 which is another embodiment of the image capture device 10. The smartphone 500 shown in FIG. 30 includes: a casing 502 that has a flat plate shape; a display panel 521 as a display section on one side of the casing 502; and a display input section 520 into which an operation panel 522 as an input section is integrated. Further, the casing 502 includes a speaker 531, a microphone 532, operation sections 540, and a camera section 541. In addition, the configuration of the casing 502 is not limited to this. For example, it may be possible to adopt a configuration in which the input section and the display section each are independent, or it may be possible to adopt a configuration having a slide mechanism or a folded structure.

Figure 31:
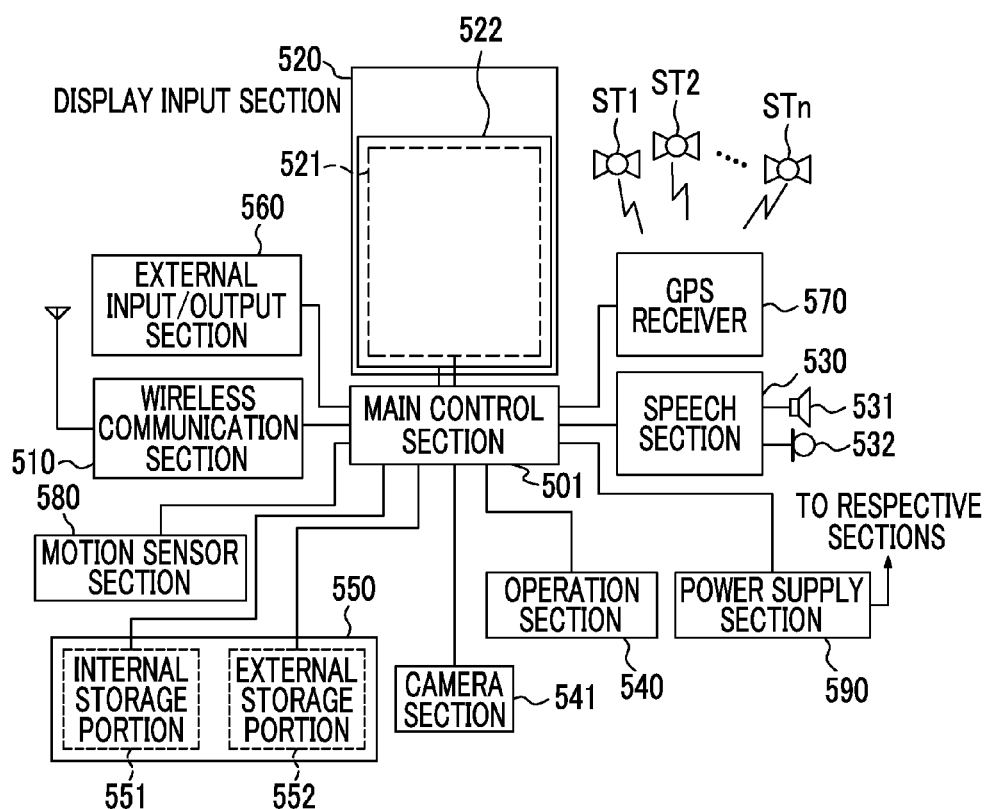
FIG. 31 is a block diagram illustrating a configuration of the smartphone.

FIG. 31 is a block diagram illustrating a configuration of the smartphone 500 shown in FIG. 30. As shown in FIG. 31, the smartphone 500 includes, as main components, a wireless communication section 510, a display input section 520, a speech section 530, the operation sections 540, the camera section 541, a storage section 550, an external input/output section 560, a global positioning system (GPS) receiver 570, a motion sensor section 580, a power supply section 590, and a main control section 501. As the main function of the smartphone 500, there is provided a wireless communication function for performing mobile wireless communication with a base station device BS through a mobile communication network NW.

The wireless communication section 510 performs wireless communication with the base station device BS, which is included in the mobile communication network NW, in accordance with an instruction of the main control section 501. Using this wireless communication, various kinds of file data such as audio data and image data, e-mail data, and the like are transmitted and received, and web data, streaming data, and the like are received.

The display input section 520 is a so-called touch panel, and includes the display panel 521 and the operation panel 522. The touch panel displays image (still image and moving image) information, text information, or the like so as to visually transfer the information to a user in accordance with control of the main control section 501, and detects a user operation on the displayed information.

The display panel 521 uses a liquid crystal display (LCD), an organic electro-luminescence display (OELD), or the like as a display device.

The operation panel 522 is a device that is provided for viewing an image which is displayed on a display screen of the display panel 521 and that detects a single pair of coordinates or a plurality of pairs of coordinates at which an operation is performed by a user's finger or a stylus. When such a device is operated by a user's finger or a stylus, the device outputs a detection signal, which is generated due to the operation, to the main control section 501. Subsequently, the main control section 501 detects the coordinates as an operation position on the display panel 521, on the basis of the received detection signal.

As shown in FIG. 30, the display panel 521 and the operation panel 522 of the smartphone 500 are integrated to constitute the display input section 520. However, the operation panel 522 is disposed to completely cover the display panel 521. When this arrangement is adopted, the operation panel 522 may have a function of also detecting a user operation in a region outside the display panel 521. In other words, the operation panel 522 may include a detection region (hereinafter referred to as a display region) for a part which overlaps with the display panel 521 and a detection region (hereinafter referred to as a non-display region) for the other part at the outer edge which does not overlap with the display panel 521.

A size of the display region and a size of the display panel 521 may completely coincide with each other, but it is not always necessary for both to coincide with each other. Further, the operation panel 522 may include two sensing regions of the outer edge part and the other inside part. Furthermore, a width of the outer edge part is appropriately designed depending on a size of the casing 502 and the like. In addition, examples of the position detection method adopted by the operation panel 522 may include a matrix switch method, a resistance film method, a surface elastic wave method, an infrared method, an electromagnetic induction method, and an electrostatic capacitance method, and the like, and any method may be adopted.

The speech section 530 includes a speaker 531 and a microphone 532. The speech section 530 is able to convert a sound of a user, which is input through the microphone 532, into sound data, which can be processed in the main control section 501, and output the data to the main control section 501, and decodes sound data, which is received by the wireless communication section 510 or the external input/output section 560, and outputs the data from the speaker 531. Further, as shown in FIG. 30, for example, the speaker 531 can be mounted on the same surface as the surface on which the display input section 520 is provided. Further, the microphone 532 can be mounted on a side surface of the casing 502.

The operation section 540 is a hardware key using a key switch or the like, and receives an instruction from a user. For example, the operation sections 540 are pressing button type switches which are mounted on the lower side surface of the lower part of the casing 502 of the smartphone 500. Each switch is turned on if it is pressed by a finger or the like, and is turned off due to a restoring force of a spring if the finger is released.

The storage section 550 stores a control program and control data of the main control section 501, the first filter according to the present invention, address data in which names, phone numbers, and the like of communication partners are associated, received and transmitted e-mail data, web data which is downloaded by web browsing, and downloaded contents data, and temporarily stores streaming data and the like. Further, the storage section 550 is constituted of an internal storage section 551, which is built into the smartphone, and an external storage section 552 which has a removable external memory slot. In addition, each of the internal storage section 551 and the external storage section 552 constituting the storage section 550 is implemented by using a storage medium such as a flash memory type, a hard disk type, a multimedia card micro type, a card type memory (such as a Micro SD (registered trademark) memory), a random access memory (RAM), or a read only memory (ROM).

The external input/output section 560 has a function of an interface with all external devices connected to the smartphone 500. The external input/output section 560 is for communication (such as universal serial bus (USB) or IEEE1394) with other external devices, direct or indirect connection to networks (such as the Internet, wireless LAN, Bluetooth (registered trademark), radio frequency identification (RFID), infrared communication (Infrared Data Association: IrDA) (registered trademark), ultra wideband (UWB) (registered trademark), and ZigBee (registered trademark)), or the like.

Examples of the external devices connected to the smartphone 500 include a wired/wireless headset, a wired/wireless external charger, a wired/wireless data port, a memory card which is connected through a card socket, a subscriber identity module (SIM) or user identity module (UIM) card, external audio and video devices which are connected through audio and video input/output (I/O) terminals, external audio and video devices which are connected in a wireless manner, a smartphone which is connected in a wired or wireless manner, a personal computer which is connected in a wired or wireless manner, a PDA which is connected in a wired or wireless manner, earphones, and the like. The external input/output section is able to transfer the data, which is transmitted from such external devices, to the components within the smartphone 500, and to transmit the data within the smartphone 500 to the external devices.

The GPS receiver 570 receives a plurality of GPS signals, which are transmitted from GPS satellites ST1 to STn, in accordance with instructions of the main control section 501, executes positioning calculation processing based on the received GPS signals, and detects a position formed of a latitude, a longitude, and an altitude of the smartphone 500. The GPS receiver 570 may detect the position by using position information when it is possible to acquire the position information from the wireless communication section 510 or the external input/output section 560 (for example, wireless LAN).

The motion sensor section 580 includes, for example, a triaxial acceleration sensor, and detects physical movement of the smartphone 500, in accordance with an instruction of the main control section 501. By detecting physical movement of the smartphone 500, an acceleration and a direction of the movement of the smartphone 500 are detected. This detection result is output to the main control section 501.

The power supply section 590 supplies the respective sections of the smartphone 500 with electric power, which is stored in a battery (not shown), in accordance with an instruction of the main control section 501.

The main control section 501 includes a micro processor, and integrally controls the respective sections of the smartphone 500 by performing an operation on the basis of control data or a control program stored in the storage section 550. Further, the main control section 501 has an application processing function and a mobile communication control function of controlling the respective sections of a communication system in order to perform data communication and sound communication through the wireless communication section 510.

The application processing function is implemented by an operation of the main control section 501 using application software stored in the storage section 550. Examples of the application processing function include: an infrared communication function of performing data communication with other devices by controlling the external input/output section 560; an e-mail function of transmitting and receiving e-mails; a web browsing function of browsing web pages; and the like.

The main control section 501 has an image processing function of displaying a video on the display input section 520 and the like, on the basis of image data (still image and moving image data) such as received data and downloaded streaming data. The image processing function means a function of causing the main control section 501 to decode the image data, apply image processing to the corresponding decoding result, and display an image on the display input section 520.

The main control section 501 executes display control for the display panel 521 and operation detection control to detect the user operation through the operation sections 540 and the operation panel 522.

Through execution of the display control, the main control section 501 displays an icon for activating application software and a window for displaying a software key such as a scroll bar or creating an e-mail. In addition, the scroll bar means a software key for receiving an instruction to move a display portion of an image on a large image which cannot be entirely shown in the display region of the display panel 521.

Through execution of the operation detection control, the main control section 501 detects the user operation performed through the operation section 540, receives an operation performed on the icon or a text input performed in an input field of the window through the operation panel 522, or receives a request to scroll a displayed image through the scroll bar.

The main control section 501 has a touch panel control function performed through execution of the operation detection control. The function determines whether the operation position of the operation panel 522 is in the overlapping part (display region) which overlaps with the display panel 521 or the other part (non-display region) at the outer edge which does not overlap with the display panel 521, and controls the display position of the software key or the sensing region of the operation panel 522.

The main control section 501 may detect a gesture operation performed on the operation panel 522, and may execute a preset function in response to the detected gesture operation. The gesture operation is not a simple touch operation used in the past. The gesture operation means an operation for drawing a locus with a finger or the like, an operation of specifying a plurality of positions at the same time, or an operation of drawing loci from a plurality of positions to at least one position as a combination of the above-mentioned operations.

The camera section 541 is a digital camera for performing electronic photography by using the image capture element such as a complementary metal oxide semiconductor (CMOS) or a charge-coupled device (CCD). The above-mentioned image capture device 10 can be applied to the camera section 541.

Under the control of the main control section 501, the camera section 541 is able to convert the image data, which is obtained through image capturing, into compressed image data such as data of a joint photographic coding experts group (JPEG), and to record the data in the storage section 550 and to output the data through the external input/output section 560 or the wireless communication section 510. In the smartphone 500 shown in FIG. 30, the camera section 541 is mounted on the same side as the display input section 520. However, the mounting position of the camera section 541 is not limited to this. The camera section 541 may be mounted on the rear side of the display input section 520, or a plurality of camera sections 541 may be mounted. In addition, in the case where a plurality of camera sections 541 is mounted, photography may be performed using a single camera section 541 by switching the camera section 541 for the photography, or photography may be performed using the plurality of camera sections 541 at the same time.

The camera section 541 can be used in various functions of the smartphone 500. For example, an image, which is acquired by the camera section 541, can be displayed on the display panel 521, and an image of the camera section 541 as one of the operation inputs of the operation panel 522 can be used. Further, when the GPS receiver 570 detects a position, the GPS receiver 570 may detect the position with reference to the image acquired from the camera section 541. Furthermore, it may be possible to determine a direction of an optical axis of the camera section 541 of the smartphone 500 or determine a current user environment, using the GPS receiver 570 in a combination with the triaxial acceleration sensor or without using the triaxial acceleration sensor, with reference to the image acquired from the camera section 541. Needless to say, the image acquired from the camera section 541 may be used in the application software.

[Others]

In the image capture device 10 of the embodiment, the first filters 102, which are generated corresponding to the point spread function (PSF) of the photography lens 12, are stored in the ROM 47, and the appropriate first filter 102 is read from the ROM 47. However, the present invention is not limited to this, the PSF and the like may be stored, and the first filter may be generated from the PSF and the like in the image capture device.

In this embodiment, the restoration processing is performed on the luminance data. However, the present invention is not limited to this, and the restoration processing may be performed using the first and second filters corresponding to the respective colors for each image data of each color of RGB.

The photography lens 12 is formed as a collapsible zoom lens, but may be a single focus lens, and may be an interchangeable lens that is detachable from the camera main body. In the case of the interchangeable lens, the restoration filter of the interchangeable lens, the PSF, and the like may be acquired through communication with the interchangeable lens.

It is apparent that the present invention is not limited to the above-mentioned embodiments, and may be modified into various forms without departing from the scope of the present invention.

EXPLANATION OF REFERENCES

2: shutter button
10: image capture device
12: photography lens
16: image capture element
24: image processing section
30: liquid crystal monitor
40: CPU
40A: AF termination determination section
42, 142: AF processing section
47: ROM
60: demosaic processing section
62: RGB/YC conversion section
100, 200, 300: restoration processing section
110: first restoration processing section
120: second restoration processing section
122, 330: selection section
130: first filter acquisition section
140: second filter acquisition section
150, 150A, 150B, 150C: in-focus determination section
210: weighted average calculation section
220, 220A, 220C: focusing time estimation section
310: third restoration processing section
320: third filter calculation section
500: smartphone

What is claimed is:

1. An image capture device comprising:
an image capture circuit that successively captures images;
an auto focus adjustment circuit that automatically performs focus adjustment on the images which are successively captured by the image capture circuit;
a first filter acquisition circuit that acquires a first filter as a restoration filter which is generated corresponding to a point spread function of an optical system of the image capture circuit;
a second filter acquisition circuit that acquires a second filter which is a zero phase filter and is applied to a defocused image of the images successively captured by the image capture circuit and of which a restoration strength is weaker than a restoration strength of the first filter;
an in-focus determination circuit that determines whether or not a processing target image included in the images successively captured by the image capture circuit is in a target in-focus state, due to the focus adjustment performed by the auto focus adjustment circuit; and
a restoration processing circuit that performs restoration processing, which uses at least the second filter acquired by the second filter acquisition circuit, on the entire processing target image in case where the in-focus determination circuit determines that the processing target image is not in the target in-focus state, and performs restoration processing which uses the first filter acquired by the first filter acquisition circuit, on the entire processing target image in case where the in-focus determination circuit determines that the processing target image is in the target in-focus state.

2. The image capture device according to claim 1, wherein the restoration processing circuit performs the restoration processing on the processing target image on the basis of the acquired first and second filters, in case where the in-focus determination circuit determines that the processing target image is not in the target in-focus state.

3. The image capture device according to claim 2, further comprising a focusing time estimation circuit that estimates a focusing time period from when the focus adjustment is started by the auto focus adjustment circuit to when the target in-focus state is achieved,
wherein the restoration processing circuit performs the restoration processing on the processing target image, on the basis of the acquired first and second filters and the estimated focusing time period, in case where the in-focus determination circuit determines that the processing target image is not in the target in-focus state.

4. The image capture device according to claim 3,
wherein the auto focus adjustment circuit detects an amount of defocus of each captured image and controls the optical system until the detected amount of defocus enters a depth-of-focus range, and
wherein the focusing time estimation circuit estimates a focusing time period from when the amount of defocus is detected to when the amount of defocus enters the depth-of-focus range.

5. The image capture device according to claim 4,
wherein the focusing time estimation circuit estimates the focusing time period only in case where the amount of defocus detected by the auto focus adjustment circuit is equal to or less than a threshold value, and
wherein the restoration processing circuit performs restoration processing by using only the acquired second filter in case where the amount of defocus is greater than the threshold value.

6. The image capture device according to claim 4, wherein the restoration processing circuit generates a first image and a second image by performing the restoration processing on the processing target image respectively on the basis of the acquired first and second filters, the in-focus determination circuit determines that the processing target image is not in the target in-focus state, and generates restored images by performing weighted averaging on the first and second images through weighting that the focusing time period estimated by the focusing time estimation circuit is the shorter, giving the larger weight to the first image.

7. The image capture device according to claim 3,
wherein the auto focus adjustment circuit calculates a high-frequency component of an in-focus region of each image captured by the image capture circuit as an evaluation value, and controls the optical system until the calculated evaluation value reaches a peak value, and
wherein the focusing time estimation circuit estimates a time period that elapses until the evaluation value reaches a first threshold value corresponding to the target in-focus state, on the basis of change in the evaluation value calculated by the auto focus adjustment circuit.

8. The image capture device according to claim 7,
wherein the focusing time estimation circuit estimates the focusing time period only in case where the evaluation value calculated by the auto focus adjustment circuit is equal to or greater than a second threshold value which is less than the first threshold value, and
wherein the restoration processing circuit performs the restoration processing by using only the acquired second filter in case where the evaluation value calculated by the auto focus adjustment circuit is less than the second threshold value.

9. The image capture device according to claim 3, wherein the restoration processing circuit generates a first image and a second image by performing the restoration processing on the processing target image respectively on the basis of the acquired first and second filters, in case where the in-focus determination circuit determines that the processing target image is not in the target in-focus state, and generates restored images by performing weighted averaging on the first and second images through weighting that the focusing time period estimated by the focusing time estimation circuit is the shorter, giving the larger weight to the first image.

10. The image capture device according to claim 3,
wherein the restoration processing circuit has a third filter calculation circuit that calculates a third filter for the processing target images which are acquired by the image capture circuit on the basis of the acquired first and second filters and the estimated focusing time period, the third filter calculation circuit calculating the third filter having a filter coefficient which gradually becomes closer to a filter coefficient of the first filter from a filter coefficient of the second filter when the focusing time period becomes longer, and
wherein the restoration processing is performed on an image, which is captured immediately before the target in-focus state is achieved after the focus adjustment is started by the auto focus adjustment circuit, among the images successively captured by the image capture circuit, by using the third filter calculated by the third filter calculation circuit, and the restoration processing is performed on an image, which is in the target in-focus state, by using the acquired first filter.

11. The image capture device according to claim 10,
wherein in case where t>t0 is established where t is a current time and t0 is a previous time at which the third filter calculation circuit calculated the third filter, assuming that the third filter at the previous time t0 is X(t0), the third filter at the current time t is X(t), a focusing time estimated by the focusing time estimation circuit at the previous time t0 is t1, the first filter acquired by the first filter acquisition circuit and corresponding to photography conditions of the optical system at the focusing time t1 is F, the second filter acquired by the second filter acquisition circuit is A, and a monotonically increasing function is W(r) where W(0)=0, W(1)=1, and 0≤r≤1,
the third filter calculation circuit calculates a currently used third filter X(t) through the following expression $$X(t)=(1-W(r))\times X(t0)+W(r)\times F,$$

where r=(t−t0)/(t1−t0), and X(0)=A.

12. The image capture device according to claim 10,
wherein the third filter calculation circuit calculates the third filter whenever a plurality of images is acquired from the image capture circuit, and
wherein the restoration processing circuit uses the third filter, which is calculated by the third filter calculation circuit, in the restoration processing for the plurality of images.

13. The image capture device according to claim 3, wherein the first filter acquisition circuit acquires the first filter, which is generated corresponding to the point spread function under photography conditions, on the basis of the photography conditions of the optical system after elapse of the focusing time period estimated by the focusing time estimation circuit.

14. The image capture device according to claim 2,
wherein the auto focus adjustment circuit detects an amount of defocus of each captured image and controls the optical system until the detected amount of defocus enters a depth-of-focus range, and
wherein the restoration processing circuit generates the first image and the second image by performing the restoration processing on the processing target image respectively on the basis of the acquired first and second filters, in case where the in-focus determination circuit determines that the processing target image is not in the target in-focus state, and generates restored images by performing weighted averaging on the first and second images through weighting that the detected amount of defocus is the smaller, giving the larger weight to the first image.

15. The image capture device according to claim 2,
wherein the auto focus adjustment circuit detects an amount of defocus of each captured image and controls the optical system until the detected amount of defocus enters a depth-of-focus range,
wherein the restoration processing circuit has a third filter calculation circuit that calculates a third filter for the images which are acquired by the image capture circuit on the basis of the acquired first and second filters and the detected amount of defocus, the third filter calculation circuit calculating the third filter having a filter coefficient which gradually becomes closer to a filter coefficient of the first filter from a filter coefficient of the second filter when the detected amount of defocus becomes smaller, and
wherein the restoration processing is performed on an image, which is captured immediately before the target in-focus state is achieved after the focus adjustment is started by the auto focus adjustment circuit, among the images successively captured by the image capture circuit, by using the third filter calculated by the third filter calculation circuit, and the restoration processing is performed on an image, which is in the target in-focus state, by using the acquired first filter.

16. The image capture device according to claim 1, further comprising:
a photography preparation instruction circuit that outputs a photography preparation instruction in accordance with a user's instruction input; and
a display circuit that displays the images successively captured by the image capture circuit as a live view image,
wherein the restoration processing circuit performs the restoration processing by using only the acquired second filter at least until the photography preparation instruction is output from the photography preparation instruction circuit.

17. The image capture device according to claim 16, wherein the restoration processing circuit performs the restoration processing by using the acquired first filter when the photography preparation instruction is output from the photography preparation instruction circuit and the focus adjustment is performed by the auto focus adjustment circuit.

18. The image capture device according to claim 1, wherein the second filter is used in common by the multiple photography conditions.

19. An image processing method using the image capture device according to claim 1, comprising:
an image acquisition step of successively acquiring images from an image capture circuit;

an auto focus adjustment step of automatically performing focus adjustment on the images which are successively captured by the image capture circuit;

a first filter acquisition step of acquiring a first filter as a restoration filter which is generated corresponding to a point spread function of an optical system of the image capture circuit;

a second filter acquisition step of acquiring a second filter which is a zero phase filter and is applied to a defocused image of the images successively captured by the image capture circuit and of which a restoration strength is weaker than a restoration strength of the first filter;

an in-focus determination step of determining whether or not a processing target image of the images successively captured by the image capture circuit is in a target in-focus state, due to the focus adjustment performed by the auto focus adjustment circuit; and a restoration processing step of performing a restoration processing, which uses at least the second filter acquired by the second filter acquisition step, on the processing target image in case where it is determined in the in-focus determination step that the processing target image is not in the target in-focus state, and performing restoration processing which uses the first filter acquired by the first filter acquisition step, on the processing target image in case where it is determined in the in-focus determination step that the processing target image is in the target in-focus state.

20. The image processing method according to claim 19, the method further comprising a focusing time estimation step of estimating a focusing time period from when the focus adjustment is started by the auto focus adjustment circuit to when the target in-focus state is achieved, wherein in the restoration processing step, the restoration processing is performed on the processing target image, on the basis of the acquired first and second filters and the estimated focusing time period, in case where it is determined in the in-focus determination step that the processing target image is not in the target in-focus state.

* * * * *